(12) United States Patent
Choi et al.

(10) Patent No.: US 9,720,450 B2
(45) Date of Patent: Aug. 1, 2017

(54) FOLDABLE ELECTRONIC DEVICE

(71) Applicant: Samsung Electronics Co., Ltd., Gyeonggi-do (KR)

(72) Inventors: Seung-Ki Choi, Gyeonggi-do (KR); Seung-Hoon Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/948,640

(22) Filed: Nov. 23, 2015

(65) Prior Publication Data

US 2016/0147263 A1    May 26, 2016

(30) Foreign Application Priority Data

Nov. 21, 2014  (KR) .................. 10-2014-0163504

(51) Int. Cl.
*H05K 7/20* (2006.01)
*G06F 1/16* (2006.01)
*H01L 23/473* (2006.01)

(52) U.S. Cl.
CPC .......... *G06F 1/1652* (2013.01); *G06F 1/1616* (2013.01); *G06F 1/1626* (2013.01)

(58) Field of Classification Search
CPC . G06F 1/181–1/182; H05K 7/20218–7/20381; H05K 7/20409–7/20418; H05K 7/20009–7/202; H01L 23/367–23/3677; H01L 23/473; H01L 23/46–23/467
USPC ...... 361/676–678, 679.46–679.54, 688–723; 165/80.1–80.5, 104.33, 185; 174/15.1–15.3, 16.1–16.3, 547, 548; 257/712–722, E23.088; 24/453, 458–459; 454/184; 312/236
See application file for complete search history.

(56) References Cited

U.S. PATENT DOCUMENTS

| | | | |
|---|---|---|---|
| 2005/0041390 A1* | 2/2005 | Huang .................. | G06F 1/1637 361/679.4 |
| 2005/0243522 A1* | 11/2005 | Nilsen .................. | H04B 1/3816 361/716 |
| 2009/0073084 A1* | 3/2009 | Mullen ................. | G06F 1/1624 345/8 |
| 2009/0244835 A1* | 10/2009 | Matsushima ........ | H05K 5/0226 361/679.55 |
| 2011/0063785 A1* | 3/2011 | Yamagiwa .......... | H04M 1/0247 361/679.01 |
| 2011/0096476 A1* | 4/2011 | Choi .................... | H04M 1/0216 361/679.01 |
| 2011/0105189 A1* | 5/2011 | Lee ........................ | G06F 1/1616 455/566 |
| 2011/0261517 A1* | 10/2011 | Fuke ....................... | H04M 1/18 361/679.01 |

(Continued)

*Primary Examiner* — Anthony Haughton
*Assistant Examiner* — Razmeen Gafur
(74) *Attorney, Agent, or Firm* — Cha & Reiter, LLC.

(57) ABSTRACT

An electronic device may include a foldable housing, and at least one electronic component arranged within the housing. The at least one electronic component may be exposed to an area external to the housing through a folding part of the housing in a folded state of the housing. The electronic device may be transitionable between a folded state and an unfolded state. Activation of the at least one electronic component may be effected by the folding or unfolding of the electronic device.

17 Claims, 21 Drawing Sheets

(56) References Cited

U.S. PATENT DOCUMENTS

| | | | |
|---|---|---|---|
| 2011/0286166 A1* | 11/2011 | Nam | G06F 1/1601 361/679.01 |
| 2012/0002360 A1* | 1/2012 | Seo | G06F 1/1616 361/679.01 |
| 2012/0008263 A1* | 1/2012 | Sugita | H04M 1/0216 361/679.01 |
| 2012/0044636 A1* | 2/2012 | Rothkopf | G06F 1/1626 361/679.55 |
| 2012/0092815 A1* | 4/2012 | Mitchell | G06F 1/1616 361/679.01 |
| 2012/0147535 A1* | 6/2012 | Ahn | G06F 1/1641 361/679.01 |
| 2012/0200991 A1* | 8/2012 | Ryu | G06F 1/1601 361/679.01 |
| 2012/0229960 A1* | 9/2012 | Pegg | H04M 1/0218 361/679.01 |
| 2012/0235898 A1* | 9/2012 | Matsumoto | H04M 1/0216 345/156 |
| 2012/0236484 A1* | 9/2012 | Miyake | G06F 1/1616 361/679.01 |
| 2012/0314399 A1* | 12/2012 | Bohn | G06F 1/1616 362/97.1 |
| 2013/0083463 A1* | 4/2013 | Yamazaki | H05K 7/00 361/679.01 |
| 2013/0208417 A1* | 8/2013 | Sirpal | G06F 1/1632 361/679.43 |
| 2013/0215567 A1* | 8/2013 | Morita | G06F 1/1637 361/679.27 |
| 2013/0217443 A1* | 8/2013 | Lim | H04M 1/0216 455/566 |
| 2013/0286551 A1* | 10/2013 | Ashcraft | G06F 1/1679 361/679.01 |
| 2013/0286562 A1* | 10/2013 | Nakajima | H05K 5/0017 361/679.01 |
| 2014/0031951 A1 | 1/2014 | Costello et al. | |

* cited by examiner

FOLDABLE ELECTRONIC DEVICE

CLAIM OF PRIORITY

This present application is related to and claims benefit under 35 U.S.C. §119(a) to Korean Application Serial No. 10-2014-0163504, which was filed in the Korean Intellectual Property Office on Nov. 21, 2014, the entire contents of which are hereby incorporated by reference.

BACKGROUND

1. Technical Field

The present disclosure generally relates to a foldable electronic device.

2. Description of the Related Art

At present, owing to the growth of electronic communication industries, user devices (e.g., smartphones and tablet computers) are becoming necessities to modern society. They are also a significant means for delivering quickly changing information. Such user devices typically utilize a Graphical User Interface (GUI) environment using a touch screen, and also provide various multimedia based on a web environment.

These user devices are also designed to have a pleasing aesthetic appearance and to be portable.

SUMMARY

Various embodiments of the present disclosure may provide an electronic device configured such that, when at least one electronic component (e.g., a connector) of the electronic device is not used, the at least one component is hidden so as not to be exposed to an exterior of the housing (i.e., the outside environment). This may improve the aesthetic appearance of the electronic device.

In accordance with an aspect of the present disclosure, an electronic device may include a foldable housing that is transitionable between a folded state and an unfolded state. At least one electronic component arranged within the housing. Herein, the at least one electronic component may be exposed to an exterior of the housing through a folding part of the housing when the housing is in the folded state As used herein, the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above features and advantages of the present disclosure will become more apparent from the following detailed description when taken in conjunction with the accompanying drawings in which.

Throughout the drawings, it should be noted that like reference numbers are used to depict the same or similar elements, features, and structures.

DETAILED DESCRIPTION

Figure 1:
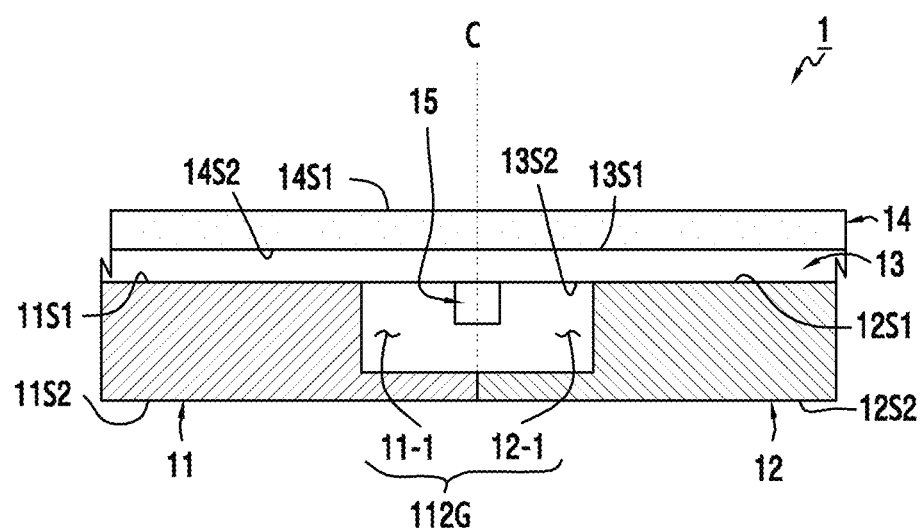
FIG. 1 and FIG. 2 are cutaway views of an electronic device in accordance with this disclosure.

The various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of various embodiments of the present disclosure as defined by the claims and their equivalents. It includes various specific details to assist in that understanding but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions "include", "may include", etc. as used in the present disclosure refers to the existence of a corresponding disclosed function, operation or component which may be used in various embodiments of the present disclosure and does not limit one or more additional functions, operations, or components. In the present disclosure, the expressions such as "include", "have", etc. as used in the present disclosure may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof. The expression "or", etc. as used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms in various embodiments of the present disclosure are used to describe various embodiments, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device that has a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (such as a head-mounted-device (HMD), such as, for example, electronic glasses, electronic clothes, an electronic bracelet, an electronic necklace, an electronic appcessory (e.g., an electronic device and/or counterpart accessory for a mobile device), an electronic tattoo, a smart watch, or the like).

According to various embodiments, the electronic device may be a smart home appliance with a communication function. The smart home appliance as an example of the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (such as SAMSUNG HOMESYNC™, APPLE TV™, or GOOGLE TV™), a game console, an electronic dictionary, an electronic key, a camcorder, and an electronic picture frame.

According to various embodiments, the electronic device may include at least one of various medical appliances (such as Magnetic Resonance Angiography (MRA), Magnetic Resonance Imaging (MRI), Computed Tomography (CT) machine, and an ultrasonic machine), navigation devices, Global Positioning System (GPS) receivers, Event Data Recorders (EDRs), Flight Data Recorders (FDRs), automotive infotainment devices, electronic equipments for ships (such as navigation equipments for ships, gyrocompasses, or the like), avionics, security devices, head units for vehicles, industrial or home robots, Automatic Teller Machines (ATM) of banking facilities, and Point Of Sales (POSs) of shops.

According to various embodiments, the electronic device includes at least one of furniture or a part of a building/structure, an electronic board, an electronic signature receiving device, a projector, and various types of measuring devices (for example, a water meter, an electric meter, a gas meter, a radio wave meter and the like) including a camera function. An electronic device according to various embodiments of the present disclosure is a combination of one or more of above described various devices. Also, an electronic device according to various embodiments of the present disclosure is a flexible device. Also, an electronic device according to various embodiments of the present disclosure is not limited to the above-described devices. Hereinafter, an electronic device according to various embodiments will be described with reference to the accompanying drawings. The term "user" used in various embodiments refers to a person who uses an electronic device or a device (for example, an artificial intelligence electronic device) that uses an electronic device.

Figure 2:
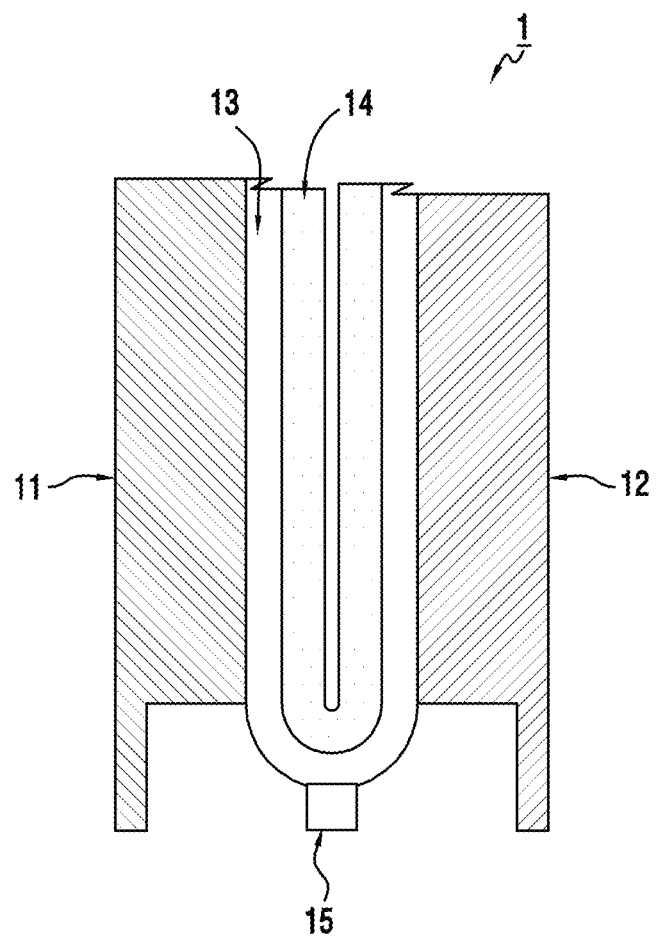

FIG. 1 and FIG. 2 are cutaway views of an electronic device according to an embodiment of the disclosure.

According to an embodiment, an electronic device 1 may include a first body 11, a second body 12, a third body 13, a fourth body 14, and at least one electronic component 15.

According to an embodiment, the first body 11 may include a first surface 11S1 and a second surface 11S2. The first surface 11S1 and the second surface 11S2 may be arranged at both sides of the first body 11, respectively. For example, the first surface 11S1 may face the third body 13. The second surface 11S2 may include an appearance of the electronic device 1. The first surface 11S1 or the second surface 11S2 may include a flat surface and/or curved surface.

According to an embodiment, the second body 12 may include a first surface 12S1 and a second surface 12S2. The first surface 12S1 and the second surface 12S2 may be arranged at both sides of the second body 12, respectively. For example, the first surface 12S1 may face the third body 13. The second surface 12S2 may include an appearance of the electronic device 1. The first surface 12S1 or the second surface 12S2 may include a flat surface and/or curved surface.

According to an embodiment, the second body 12 may include material different from the first body 11.

According to an embodiment, the second body 12 may also include color different from the first body 11.

According to an embodiment, the first body 11 or the second body 12 may include at least one part of a housing or device case of the electronic device 1.

According to an embodiment, the first body 11 or the second body 12 may also include a screen.

According to an embodiment, at least one part of the third body 13 may be arranged between the first body 11 and the fourth body 14. Alternatively, at least one part of the third body 13 may be arranged between the second body 12 and the fourth body 14. The third body 13 may include a first surface 13S1 and a second surface 13S2. The first surface 13S1 and the second surface 13S2 may be arranged at both sides of the third body 13, respectively. For example, the first surface 13S1 may face the fourth body 14. The second surface 13S2 may face the first body 11 and the second body 12.

According to an embodiment, the third body 13 may have flexibility. For example, the third body 13 may include a circuit board (e.g., a Flexible Printed Circuit Board (FPCB)).

According to an embodiment, the fourth body 14 may include a first surface 14S1 and a second surface 14S2. The first surface 14S1 and the second surface 14S2 may be arranged at both sides of the fourth body 14, respectively. For example, the second surface 14S2 may face the third body 13. The first surface 14S1 may form an appearance of the electronic device 1.

According to an embodiment, the first surface 14S1 may include a screen. Herein, a touch input is possible through the screen. The first surface 14S1 may also include a flat surface, as illustrated, or include a curved surface although not illustrated.

According to an embodiment, the fourth body 14 may be flexible.

According to an embodiment, the at least one electronic component 15 (e.g., the connector) may be arranged on the second surface 13S2 of the third body 13.

According to an embodiment, a first space 11-1 may exist between the first surface 11S1 of the first body 11 and the second surface 13S2 of the third body 13. Or, a second space 12-1 may be positioned between the first surface 12S1 of the second body 12 and the second surface 13S2 of the third body 13. Alternatively, although not illustrated, only one of the first space 11-1 and the second space 12-1 may be provided.

According to an embodiment, the first body 11 and the second body 12 may come in contact with each other (see FIG. 1). Herein, the second surface 11S2 of the first body 11 and the second surface 12S2 of the second body 12 may be coupled to one another or connected with each other smoothly. Also, the third body 13 or the fourth body 14 may be in a non-deformed state. A connection between the first body 11 and the second body 12 may be maintained by an elastic force provided by the third body 13 or the fourth body 14. Herein, the first space 11-1 and the second space 12-1 may be connected with each other and thus, one space 112G may be prepared. Also, the at least one electronic component 15 may be arranged within the space 112G and may not be exposed to the external.

According to an embodiment, the first body 11 and the second body 12 may be separated from each other (see FIG. 2). For example, the electronic device 1 may be folded centering on a space (i.e., centerline C of FIG. 1) between the first body 11 and the second body 12 by means of external force. Herein, a space (i.e., the space 112G of FIG. 1) is opened and thus, the at least one electronic component 15 may be exposed to an area that is external to the first and second bodies 11, 12. If the external force is released, the electronic device 1 may be restored to the original state of FIG. 1 by means of the elastic force provided by the third body 13 and the fourth body 14.

According to an embodiment, though not illustrated, at least one electronic component may be arranged between the first body 11 and the third body 13. Or, at least one electronic component may be arranged between the second body 12 and the third body 13.

Figure 3:
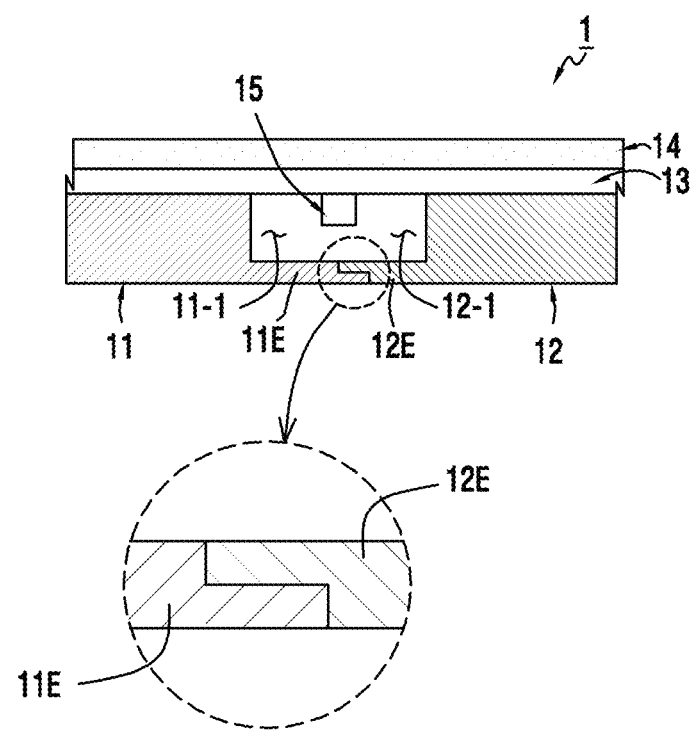
FIG. 3 is an enlarged view of an indicated area of the electronic device of FIGS. 1 and 2.

FIG. 3 is an enlarged view of an indicated area of the electronic device of FIGS. 1 and 2.

Referring to FIG. 3, a first body 11 may include an extension part (11E). A first space 11-1 may exist between the extension part 11E and a third body 13.

According to an embodiment, a second body 12 may include an extension part (12E). A second space 12-1 may exist between the extension part 12E and the third body 13.

According to an embodiment, connection between the extension part 11E of the first body 11 and the extension part 12E of the second body 12 may include fitting.

Figure 4:
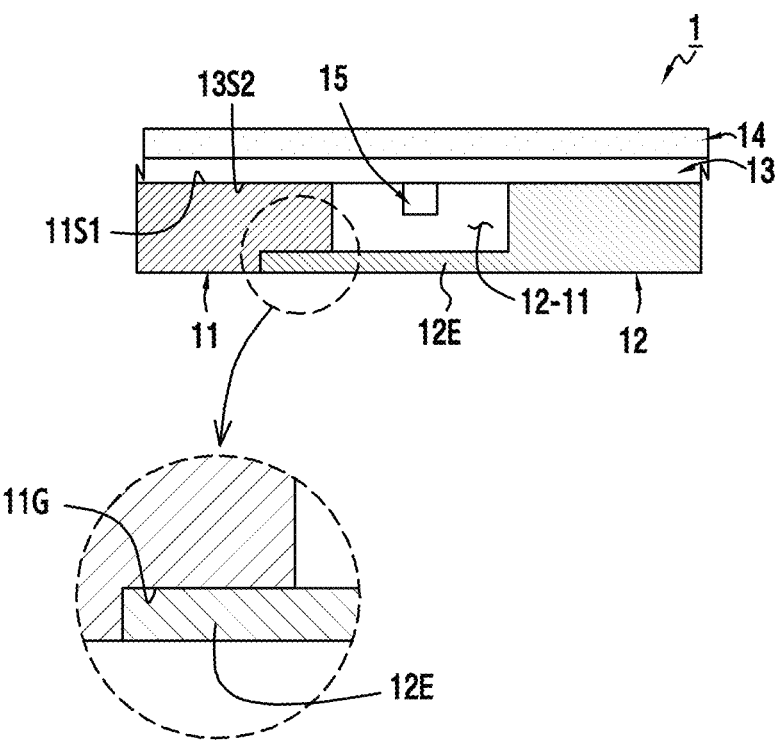
FIG. 4 is an enlarged view of an indicated area of the electronic device of FIGS. 1 and 2.

FIG. 4 is an enlarged view of an indicated area of the electronic device of FIGS. 1 and 2.

Referring to FIG. 4, a first body 11 may include a recess 11G that is formed in a second surface 11S2 of the first body 11. The first surface 11S1 of the first body 11 and a second surface 13S2 of a third body 13 may be in contact with one another such that there is no space between the first surface 11S1 and the second surface 13S2.

According to an embodiment, a second body 12 may include an extension part 12E. A second space 12-11 may exist between the extension part 12E and the third body 13.

According to an embodiment, the extension part 12E of the second body 12 may be fitted into the recess 12G of the first body 11.

Figure 5:
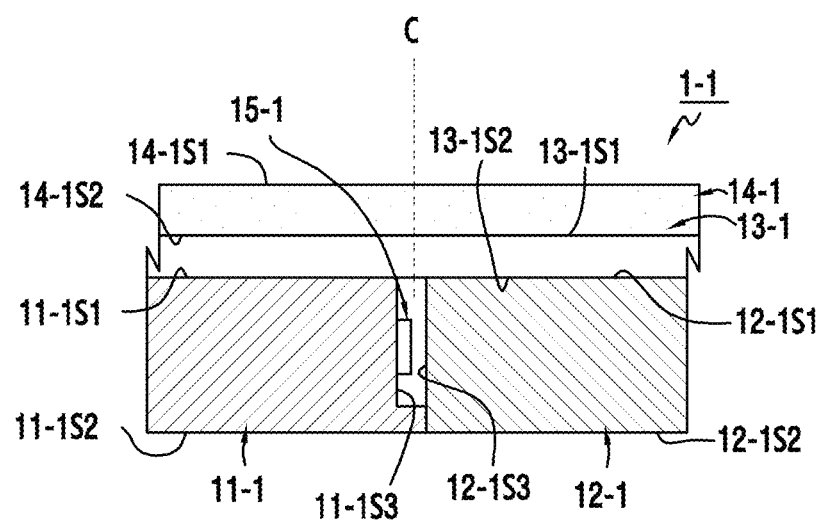
FIG. 5 is a cutaway view of an electronic device in accordance with this disclosure.

FIG. 5 is a cutaway view of an electronic device in accordance with this disclosure.

According to an embodiment, the electronic device 1-1 may include a first body 11-1, a second body 12-1, a third body 13-1, a fourth body 14-1, and at least one electronic component 15-1 (e.g., a connector).

According to an embodiment, the first body 11-1 may include a first surface 11-1S1, a second surface 11-1S2, and a third surface 11-1S3. The first surface 11-1S1 may face the third body 13-1. The second surface 11-1S2 may include an appearance of the electronic device 1-1. The third surface 11-1S3 may be disposed between the first surface 11-1S1 and the second surface 11-1S2.

According to an embodiment, the second body 12-1 may include a first surface 12-1S1, a second surface 12-1S2, and a third surface 12-1S3. The first surface 12-1S1 may face the third body 13-1. The second surface 12-1S2 may include an appearance of the electronic device 1-1. The third surface 12-1S3 may connect between the first surface 12-1S1 and the second surface 12-1S2.

According to an embodiment, at least one part of the third body 13-1 may be arranged between the first body 11-1 and the fourth body 14-1. Alternatively, at least one part of the third body 13-1 may be arranged between the second body 12-1 and the fourth body 14-1. The third body 13-1 may include a first surface 13-1S1 and a second surface 13-1S2. The first surface 13-1S1 may face the fourth body 14-1. The second surface 13-1S2 may face the first body 11-1 and the second body 12-1.

According to an embodiment, the third body 13-1 may be flexible.

According to an embodiment, the fourth body 14-1 may include a first surface 14-1S1 and a second surface 14-1S2. The second surface 14-1S2 may face the third body 13-1. The first surface 14-1S1 may include an appearance of the electronic device 1-1. According to an embodiment, the first surface 14-1S1 may include a screen.

According to an embodiment, the fourth body 14-1 may have flexibility.

According to an embodiment, the at least one electronic component 15-1 may be arranged on the third surface 11-1S3 of the first body 11-1. Or, the at least one electronic component 15-1 may be also arranged on the third surface 12-1S3 of the second body 12-1, although not illustrated. The at least one electronic component 15-1 may be electrically connected with the third body 13-1.

According to an embodiment, the first body 11-1 and the second body 12-1 may come in contact (connected) with each other. Herein, the third body 13-1 or the fourth body 14-1 may be in a non-deformed state. Connection between the first body 11-1 and the second body 12-1 may be maintained by an elastic force that is exerted by the third body 13-1 or the fourth body 14-1. The third surface 11-1S3 of the first body 11-1 and the third surface 12-1S3 of the second body 12-1 may face each other. The at least one electronic component 15-1 may be arranged on the third surface 11-1S3 of the first body 11-1 or the third surface 12-1S3 of the second body 12-1.

According to an embodiment, though not illustrated, the first body 11-1 and the second body 12-1 may be separated from each other. For example, the electronic device 1-1 may be folded centering on the space (C) between the first body 11-1 and the second body 12-1 by means of an external force. When the external force is released, the electronic device 1-1 may be restored to the original state of FIG. 5 by an elastic force exerted by the third boy 13-1 and the fourth body 14-1. Herein, the third surface 11-1S3 of the first body 11-1 and the third surface 12-1S3 of the second body 12-1 may be exposed to the external and thus, the at least one electronic component 15-1 may be also exposed to the external.

Figure 6:
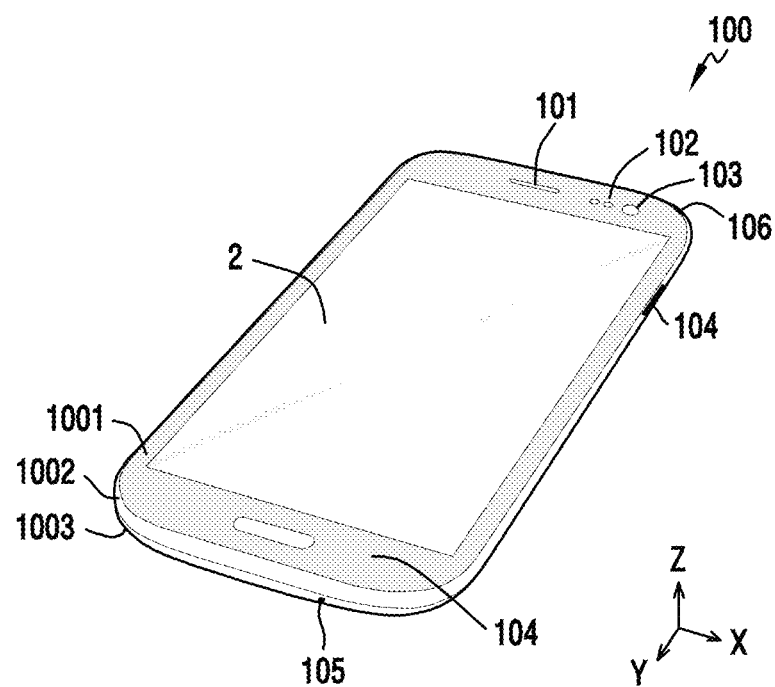
FIG. 6 is a perspective view of an electronic device in accordance with this disclosure.

FIG. 6 is a perspective view of an electronic device in accordance with this disclosure.

Referring to FIG. 6, the electronic device 100 (e.g., the electronic device 1) may include an upper surface 1001, a lateral surface 1002, and a lower surface 1003. The upper surface 1001 and the lower surface 1003 may face each other, and the lateral surface (or an edge) may connect between the upper surface 1001 and the lower surface 1003. The upper surface 1001, the lateral surface 1002, or the lower surface 1003 may include a flat surface or curved surface. For example, the electronic device 100 may include an upper surface 1001 or lower surface 1003 of a form of a convex or concave curved surface, although not illustrated.

The electronic device 100 may include a display set 2, a speaker 101, a sensor 102, a camera 103, buttons 104, a microphone 105, and/or an antenna 106.

The display set 2 may be arranged on the upper surface 1001 of the electronic device 100. The display set 2 may include a Liquid Crystal Display (LCD) or an Active-Matrix Organic Light Emitting Diode (AMOLED). The display set 2 may also include a touch-sensing device (e.g., a touch panel or digitizer panel) capable of recognizing a touch input.

The speaker 101 may be arranged on the upper surface 1001 of the electronic device 100. Although not illustrated, the speaker 101 may be also arranged on the lateral surface 1002 or lower surface 1003 of the electronic device 100.

The sensor 102 may be arranged on the upper surface 1001 of the electronic device 100, but this does not intend to limit the scope of the present disclosure. The sensor 102 may measure a physical quantity or sense an activation state of the electronic device 100. The measured or sensed information may be converted into an electrical signal. The sensor 102 may include a gesture sensor, a proximity sensor, a grip sensor, a gyro sensor, an acceleration sensor, a geomagnetic sensor, an air pressure sensor, a temperature/humidity sensor, a hall sensor, a Red, Green, Blue (RGB) sensor, an illumination sensor, a bio-physical sensor (e.g., a heart rate sensor), and/or an Ultra-Violet (UV) sensor.

The camera 103 may be arranged on the upper surface 1001 of the electronic device 100 as illustrated, but this does not intend to limit the scope of the present disclosure.

The buttons 104 may be arranged on the upper surface 1001 or lateral surface 1002 of the electronic device 100 as illustrated, but this does not intend to limit the scope of the present disclosure. The buttons 104 may utilize a press scheme or touch scheme. For example, the buttons may be physical dedicated buttons or they may be virtual buttons such as those that may appear on a touch screen or display.

The microphone 105 may be arranged on the lateral surface 1002 of the electronic device 100. Alternatively or additionally, the microphone 105 may be arranged on the upper surface 1001 or lower surface 1003 of the electronic device 100 though not illustrated.

The antenna 106 (e.g., a Digital Multimedia Broasdcasting (DMB) antenna and a cellular antenna) may be withdrawn and extended to the external through a through-hole (not shown) arranged in the lateral surface 1002 of the electronic device 100. Or, the antenna 106 may be an embedded antenna, which may be mounted on a housing of the electronic device 100 or a case frame thereof or a circuit board (e.g., a main board) thereof, though not illustrated.

According to an embodiment, the electronic device 100 may be folded centering on an X axis or Y axis.

Figure 7:
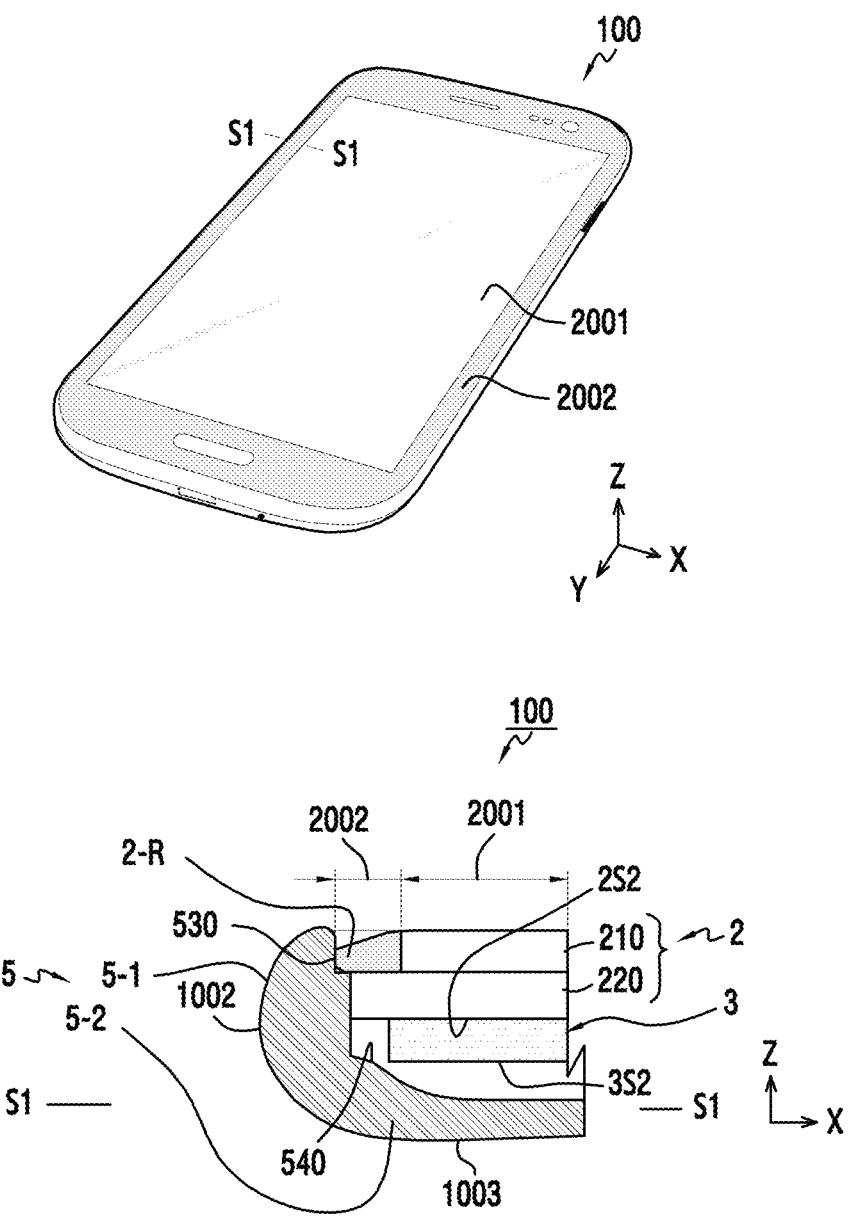
FIG. 7 is an enlarged view of a cross section of the electronic device of FIG. 6 taken along section line S1-S1.

FIG. 7 is an enlarged view of a cross section of the electronic device of FIG. 6 taken along section line S1-S1.

Referring to FIG. 7, the electronic device 100 may include a display set 2, a circuit board 3, and/or a device case 5.

The display set 2 (e.g., the fourth body 14 of FIG. 1) may include a window 210 and a display panel 220.

The window 210 may include a transparent plate, an adhesive layer, a plastic film, a pattern layer, a metal layer, and/or a light-shielding layer.

The transparent plate may be arranged above the display panel 220, and protect the display panel 220. The transparent plate may be formed of plastic materials (e.g., an acrylic having impact resistance) or glass materials (e.g., a tempered glass).

The adhesive layer may be arranged between the transparent plate and the plastic film, and attach the plastic film to the transparent plate. The adhesive layer may be arranged in an edge area 2002 (e.g., a four-cornered ring area) of the window 210. The adhesive layer may not be overlapped with a view area 2001. Herein, the view area 2001 may indicate an area displaying an image of the display panel 220, and may be dubbed a 'display area'. The adhesive layer may be transparent. Alternatively or additionally, the adhesive layer may be dyed using dye, pigment, coloring matters, fluorescent materials and/or phosphorescent materials. The adhesive layer may include a Pressure Sensitive Adhesive (PSA).

The plastic film may be attached or coupled to the edge area 2002 of the window 210 by the medium of the adhesive layer. The plastic film may be of a band shape corresponding to the edge area 2002 of the window 210. The plastic film may not be overlapped with the view area 2001. The plastic film may be transparent. The plastic film may be formed of materials having high heat stability and high mechanical strength. The plastic film may be a polyethyleneterephthalate (PET) film, a polycarbonate (PC) film, a polyethylene (PE) film, or a polypropylene (PP) film.

The pattern layer may include various patterns (e.g., a flat pattern or three-dimensional pattern) attached to or printed on a lower surface of the plastic film. The pattern layer may not be overlapped with the visible area 2001. The pattern layer may be formed through UV molding. The pattern layer formed through the UV molding may have a pattern corresponding to a pattern formed in a mold. The pattern of the mold may be formed through mechanical processing, laser processing or photolithography. The pattern layer may be shined by external light and show a texture of metal. A pattern of the pattern layer may be a hairline (e.g., be relatively thin). Since the pattern layer may be arranged under the transparent plate having a certain thickness, the pattern of the pattern layer may be viewable in three dimensions through the transparent plate.

The metal layer may be attached to a lower surface of the pattern layer. The metal layer may not be overlapped with the visible area 2001. The metal layer may be formed in a manner of depositing (e.g., physical vapor deposition (PVD) or chemical vapor deposition (CVD)) or coating metals (e.g., stannum (Sn), aluminum (Al), silicon (Si), titanium (Ti), titanium carbide (TiC), titanium nitride (TiN), titanium columbium (TiCB), or Al2O3) on the lower surface of the pattern layer. The metal layer may reflect external light and may be textured. Since the metal layer is arranged under the transparent plate has a certain thickness, a pattern of the metal layer may be shown in three dimensions through the transparent plate.

An area of the transparent plate not corresponding to the visible area 2001 may be expressed as a texture of metal materials owing to the underlying pattern layer and metal layer expressing the texture of metal.

The light-shielding layer may be formed on a lower surface of the metal layer. The light-shielding layer may not be overlapped with the visible area 2001. The light-shielding layer may shield external light shining an edge area of the transparent plate. The light-shielding layer may shield light traveling from the display panel 220 in order not to shine the edge area of the transparent plate. The light-shielding layer may include a black ingredient absorbing light without reflecting light. The light-shielding layer may be a layer printed with black color. The light-shielding layer may be an adhesive including a black ingredient. The light-shielding layer may include a black film and material(s) including an adhesive ingredient.

The display panel 220 may be arranged under the window 210. For example, the display panel 220 may be attached to a transparent adhesive layer, and be arranged under the light-shielding layer of the window 210. The display panel 220 may be an LCD or an AMOLED.

The display set 2 may further include a non-shown touch-sensing device. For example, a touch panel (e.g., a capacitive touch panel or a resistive touch panel) may be arranged between the window 210 and the display panel 220. Or, a digitizer panel may be arranged under the display panel 220. The touch-sensing device may sense a touch input within the visible area 2001. The visible area 2001 may be dubbed a 'touch recognition area'.

The display set 2 may also further include a mounting plate (e.g., a non-metallic or metallic bracket) arranged under the display panel 220.

According to an embodiment, the window 210 and the display panel 220 may have flexibility.

The circuit board 3 (e.g., the third body 13 of FIG. 1) may be arranged under the display set 2. At least one part of the circuit board 3 may come in contact to the display set 2. Or, at least one part of the circuit board 3 may be kept away from the display set 2. The circuit board 3 may include a substrate on which a basic circuit and a plurality of electronic components are mounted. The circuit board 3 may include a main board or a motherboard. The circuit board 3 may set up an execution environment of the electronic device 100 and maintain information thereof and stably drive the electronic device 100. Also, the circuit board 3 may make smooth data input/output exchange of all devices of the electronic device 100.

According to an embodiment, the circuit board 3 may have flexibility.

The device case 5 (e.g., the first body 11 and the second body 12) may form a housing of the electronic device 100. The device case 5 may include a first case body 5-1 and a second case body 5-2. The first case body 5-1 may include a lateral surface 1002 of the electronic device 100. The second case body 5-2 may be extended from the first case body 5-1, and be arranged under the display set 2.

According to an embodiment, the device case 5 may include a first mounting part 530 and a second mounting part 540. The first mounting part 530 may be a part on which the display set 2 is mounted. For example, the first mounting part 530 may include a ring shape edge formed at an upper end part of the first case body 5-1. An edge 2-R of the display set 2 (e.g., an edge of the window 210) may be attached to the first mounting part 530. The display set 2 may be attached to the first mounting part 530. There may be a space between the display set 2 and the device case 5 to arrange electronic components (e.g., the circuit board 3) therein.

The second mounting part 540 may be a part in which the circuit board 3 is mounted. The second mounting part 540 may be arranged under the first mounting part 530. The second mounting part 540 may include various shapes (e.g., recesses) including a flat surface and/or curved surface on which the circuit board 3 may be mounted. The second mounting part 540 may include a boss (not shown) for bolt binding with the display set 2 or the circuit board 3.

The second mounting part 540 may include the lower surface 1003 (e.g., the second surface 11S2 of the first body 11 or the second surface 12S2 of the second body 12 illustrated in FIG. 1) of the electronic device 100.

According to an embodiment, the device case 5 may be distinguished into two parts, and may be folded centering on a connection portion between the two parts.

Figure 8:
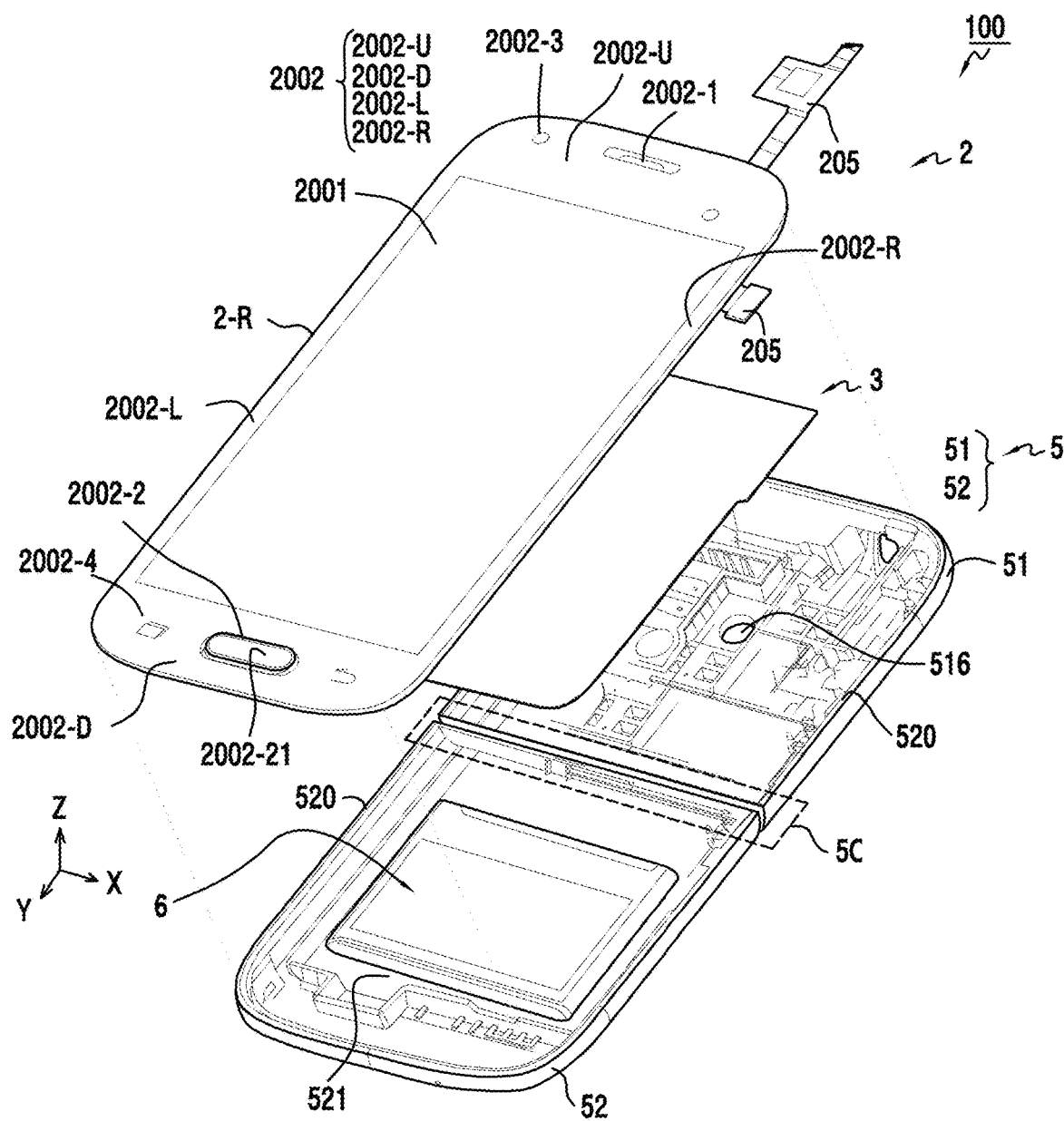
FIG. 8 is an exploded view of the electronic device of FIG. 6.

FIG. 8 is an exploded view of the electronic device of FIG. 6.

Referring to FIG. 8, the electronic device 100 may include a display set 2, a circuit board 3, a device case 5, and/or a battery pack 6.

The display set 2 (e.g., the fourth body 14 of FIG. 1) may be generally of a flat plate type of a four corner (e.g., a rectangle). The display set 2 may include a display area 2001 and a non-display area 2002. The display area 2001 may correspond to a screen. The display area 2001 may be a rectangle of a form of being long in a Y-axis direction. The non-display area 2002 (e.g., the edge area 2002 of FIG. 7), which is an area surrounding the display area 2001, may be of a ring shape. For example, the non-display area 2002 may include an up edge area 2002-U, a down edge area 2002-D, a left edge area 2002-L, and a right edge area 2002-R. The up edge area 2002-U and the down edge area 2002-D may be arranged to face each other. Also, the left edge area 2002-L and the right edge area 2002-R may be arranged to face each other. The up edge area 2002-U or the down edge area 2002-D may have a relatively large width as compared to the left edge area 2002-L or the right edge area 2002-R. The non-display area 2002 may be expressed with black color. The non-display area 2002 may express a texture of metal.

The display set 2 may include a receiver hole 2002-1 arranged in the non-display area 2002 (e.g., the up edge area 2002-U). The receiver hole 2002-1 may be located correspondingly to a receiver (not shown) installed in the circuit board 3 or the device case 5. The receiver may output a sound through the receiver hole 2002-1.

Or, the display set 2 may include a button hole 2002-2 arranged in the non-display area 2002 (e.g., the down edge area 2002-D). The display set 2 may include a button circuit (not shown) arranged under a window (210 of FIG. 7). A button 2002-21 of the button circuit may be arranged on an upper surface (1001 of FIG. 6) of the electronic device 100 through the button hole 2002-2.

The display set 2 may further include touch key markers 2002-4 arranged in the non-display area 2002. The touch key markers 2002-4 may be arranged at both sides of the button hole 2002-2. The display set 2 may include a touch key circuit (not shown) arranged under the window 210. The touch key circuit may be arranged correspondingly to the touch key markers 2002-4.

The display set 2 may include an electrical connection means 205 (e.g., an FPCB). The electrical connection means 205 may be used to electrically connect between a display panel (220 of FIG. 7) mounted on the display set 2 or a touch key device (not shown) (e.g., a touch panel or digitizer panel) and the circuit board 3. The electrical connection means 205 may be used to electrically connect between the button circuit (not shown) mounted on the display set 2 or a touch key set and the circuit board 3. One end (not shown) of the electrical connection means 205 may include a connector (e.g., a male connector or a female connector) connectable with a connector of the circuit board 3. The electrical connection means 205 may be flexible, and may be connected with or coupled to a connector (not shown) that may be mounted on a lower surface (3S2 of FIG. 7) of the circuit board 3.

The circuit board 3 (e.g., the third body 13 of FIG. 1) may be arranged between the display set 2 and the device case 5. The circuit board 3 may be arranged on a lower surface (2S2 of FIG. 7) of the display set 2.

According to an embodiment, the circuit board 3 may include an FPCB. Though described later, the circuit board 3 may be folded correspondingly to a space 5C (i.e., a folding part of the electronic device 100) between the first case body 51 and the second case body 52.

According to an embodiment, only one portion of the circuit board 3 corresponding to the space 5C between the first case body 51 and the second case body 52 may have flexibility.

According to a further embodiment, the circuit board 3 may also include a plurality of circuit boards (not shown) separable from one another. For example, the circuit board 3 may include a first circuit board (not shown) arranged correspondingly to the first case body 51 centering on the space 5C (i.e., the folding part of the electronic device 100) between the first case body 51 and the second case body 52, and a second circuit board (not shown) arranged correspondingly to the second case body 42. The first circuit board and the second circuit board may be electrically connected with each other by the medium of a flexible connection means (e.g., an FPCB).

The device case 5 may be arranged under the circuit board 3. The device case 5 may be of a container shape including an upper opening part 520. The upper opening part 520 may include a part in which the display set 2 is installed. For example, the edge 2-R of the display set 2 may be attached to the upper opening part 520 of the device case 5.

Also, the device case 5 may include the first case body 51 (e.g., the first body 11 of FIG. 1) and the second case body 52 (e.g., the second body 12 of FIG. 1). For example, the first case body 51 and the second case body 52 may be arranged at both sides of the electronic device 100, respectively (aligned in a Y-axis direction in the drawing). Herein, one part of the circuit board 3 may be arranged between the first case body 51 and the display set 2. Also, one part of the circuit board 3 may be arranged between the second case body 52 and the display set 2.

Although not illustrated, the electronic device 100 may be folded centering on the space 5C between the first case body 51 and the second case body 52. The display set 2 and the circuit board 3 may be also folded correspondingly to folding of the device case 5.

At least one electronic component (not shown) (e.g., 15 of FIG. 1) may be arranged in a folding part (not shown) of the electronic device 100. If the electronic device 100 is in a non-folded state, the at least one electronic component may not be exposed to an exterior of the electronic device. When the electronic device 100 is in a folded state, the at least one electronic component may be exposed to the external.

The at least one electronic component may be mounted on the circuit board 3. Or, the at least one electronic component may be arranged in the device case 5 (e.g., the first case body 51 or the second case body 52). The at least one electronic component may be electrically connected to the circuit board 3 by the medium of an electrical connection means (e.g., an FPCB).

According to an embodiment, the circuit board 3 may include a connector (not shown). The connector of the circuit board 3 may be exposed to the external in a folded state of the electronic device 100. Herein, the connector may include a connection terminal such as a contact (or a copper film pad) which is surface mounted on the lower surface 3S2 of the circuit board 3. Or, the connector may include a male connector (e.g., a plug) or a female connector (e.g., a socket). Or, the connector may include an elastic contact terminal (e.g., an elastic fragment and a pogo pin). Or, the connector, which is an interface part capable of contacting an external device (e.g., an electric charger), may apply a communication scheme such as a High Definition Multimedia Interface (HDMI), a Universal Serial Bus (USB), a projector, and/or a D-subminiature (D-sub).

According to another embodiment, a camera module may be also exposed to the external in a folded state of the electronic device 100.

According to a further embodiment, a sensor module (e.g., a bio-physical sensor such as an iris recognition sensor, a blood pressure measuring sensor, and a heart rate sensor) may be also exposed to the external in a folded state of the electronic device 100.

According to a yet another embodiment, a light emitting means (e.g., an LED) may be also exposed to the external in a folded state of the electronic device 100.

In addition to this, various components may be exposed to the external in a folded state of the electronic device 100. For example, at least one electronic component may include an image related component (e.g., a camera or a sensor) or a voice related component (e.g., a microphone, a speaker or a receiver).

The display set 2 or the circuit board 3 may have flexibility, and provide an elastic force to unfold the electronic device 100.

According to an embodiment, the space 5C between the first case body 51 and the second case body 52 may not be in a direct connection state. For example, the first case body 51 and the second case body 52 may be attached to the display set 2 or the circuit board 3.

According to an embodiment, the space 5C between the first case body 51 and the second case body 52 may include hinge connection (not shown). The first case body 51 may use the hinge connection to be rotated with respect to the second case body 52. Herein, the hinge connection may further include a non-shown elastic member. The elastic member may additionally provide a force to unfold the electronic device 100.

The first case body 51 may include a transparent window 516. For example, the transparent window 516 may be arranged to correspond to an optical electronic component (e.g., a camera module) arranged on the lower surface (3S2 of FIG. 7) of the circuit board 3.

The second case body 52 may include a battery pack mounting part 521.

A battery pack 6 may be arranged in the battery pack mounting part 521 of the second case boy 52.

According to an embodiment, a combination between the circuit board 3 and the display set 2 may include bolt binding.

Figure 9:
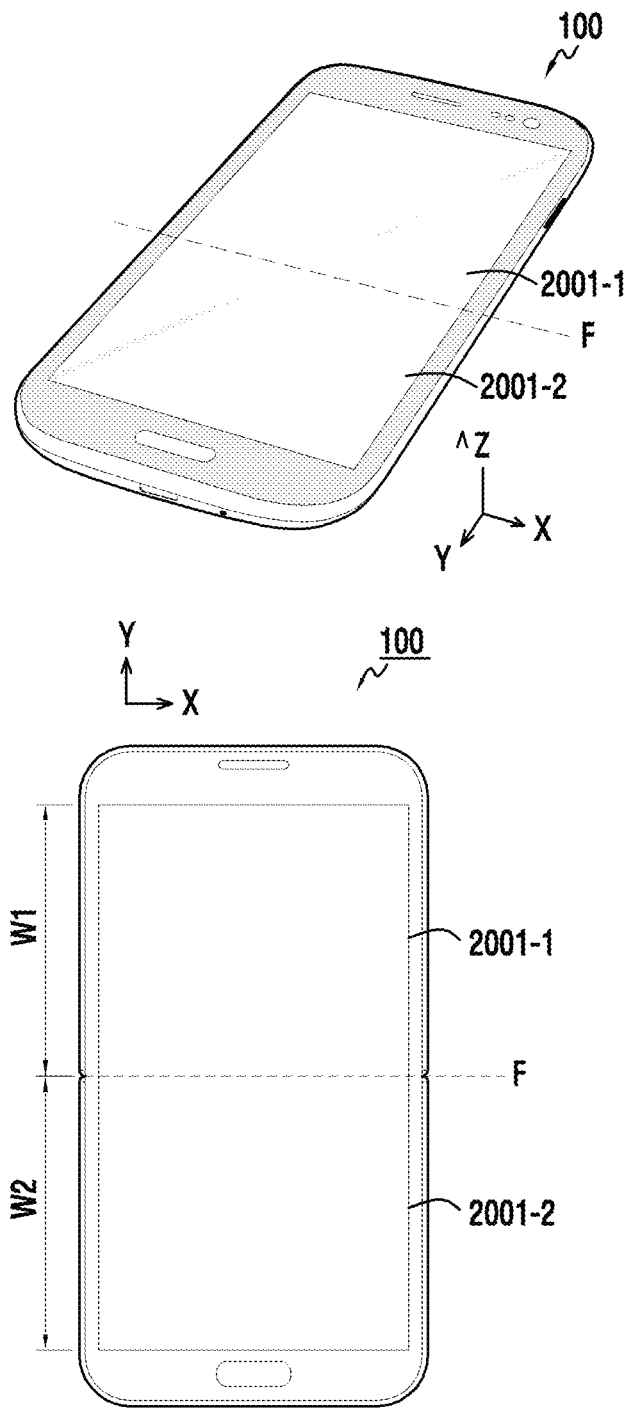
FIG. 9, FIG. 10, FIG. 11 and FIG. 12 are views of an electronic device according to an embodiment of this disclosure.

FIG. 9 illustrates an embodiment of an electronic device according to this disclosure.

Referring to FIG. 9, the electronic device 100 may be folded using a folding part (F). Herein, the folding part (F) may be located corresponding to the space (5C of FIG. 8) between the first case body 51 and the second case body 52. A screen (e.g., the display area 2001) may be divided into a first screen 2001-1 and a second screen 2001-2 on a basis of the folding part (F).

The first screen 2001-1 and the second screen 2001-2 may be provided in one display panel (e.g., 220 of FIG. 7).

According to an embodiment, though not illustrated, a display panel providing the first screen 2001-1 and a display panel providing the second screen 2001-2 may be also different from each other. Or, the first screen 2001-1 may be separated from the second screen 2001-2. With respect to a Y-axis direction, a width (W1) of the first screen 2001-1 may be the same as or be different from a width (W2) of the second screen 2001-2.

Figure 10:
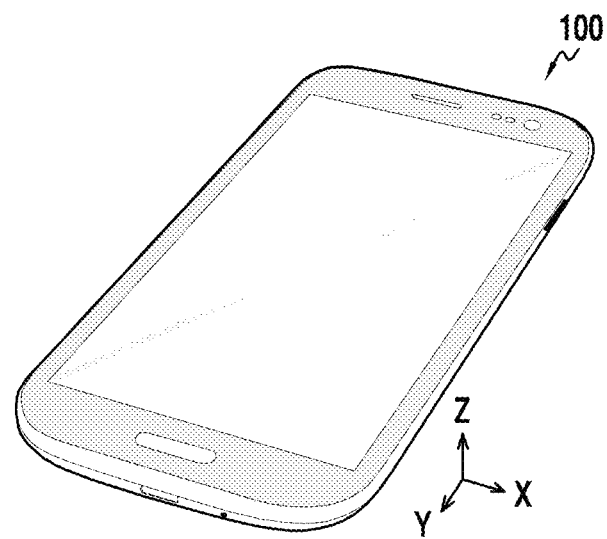
Figure 10:
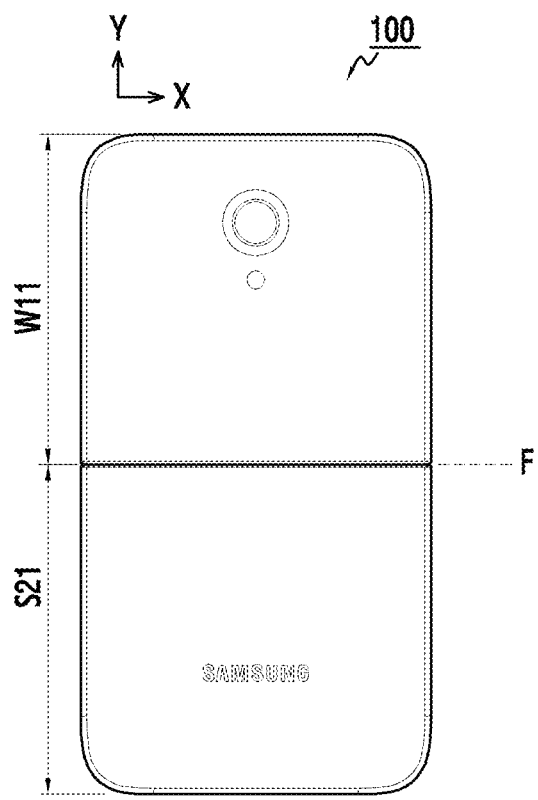

FIG. 10 illustrates an embodiment of an electronic device according to this disclosure.

Referring to FIG. 10, a device case 5 of the electronic device 100 may include a first case body 51 and a second case body 52. A space between the first case body 51 and the second case body 52 may include a folding part (F). The folding part (F) may be located corresponding to the space (5C of FIG. 8) between the first case body 51 and the second case body 52. With respect to a Y-axis direction, a width (W11) of the first case body 51 may be the same as or be different from a width (W21) of the second case body 52.

Figure 11:
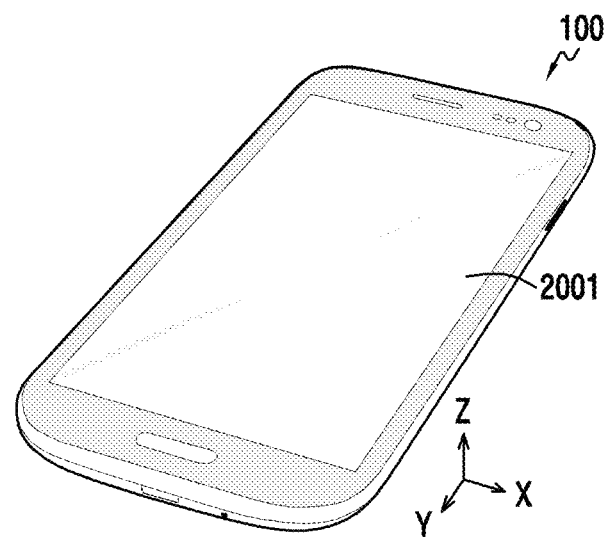
Figure 11:
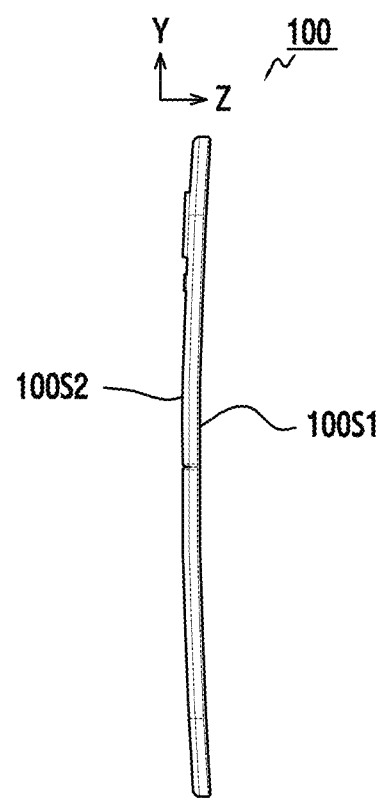

FIG. 11 illustrates an embodiment of an electronic device according to this disclosure.

Referring to FIG. 11, the electronic device 100 may include an appearance of a curved shape. For example, the electronic device 100 may include a first surface 100S1 and a second surface 100S2 that face each other. The first surface 100S1 may include a screen 2001. The first surface 100S1 may include a concave curved surface. Or, though not illustrated, the first surface 100S1 may also include a convex curved surface. The second surface 100S2 may include a surface of the device case 5. The second surface 100S2 may include a convex curved surface. Although not illustrated, the second surface 100S2 may also include a concave curved surface.

Figure 12:
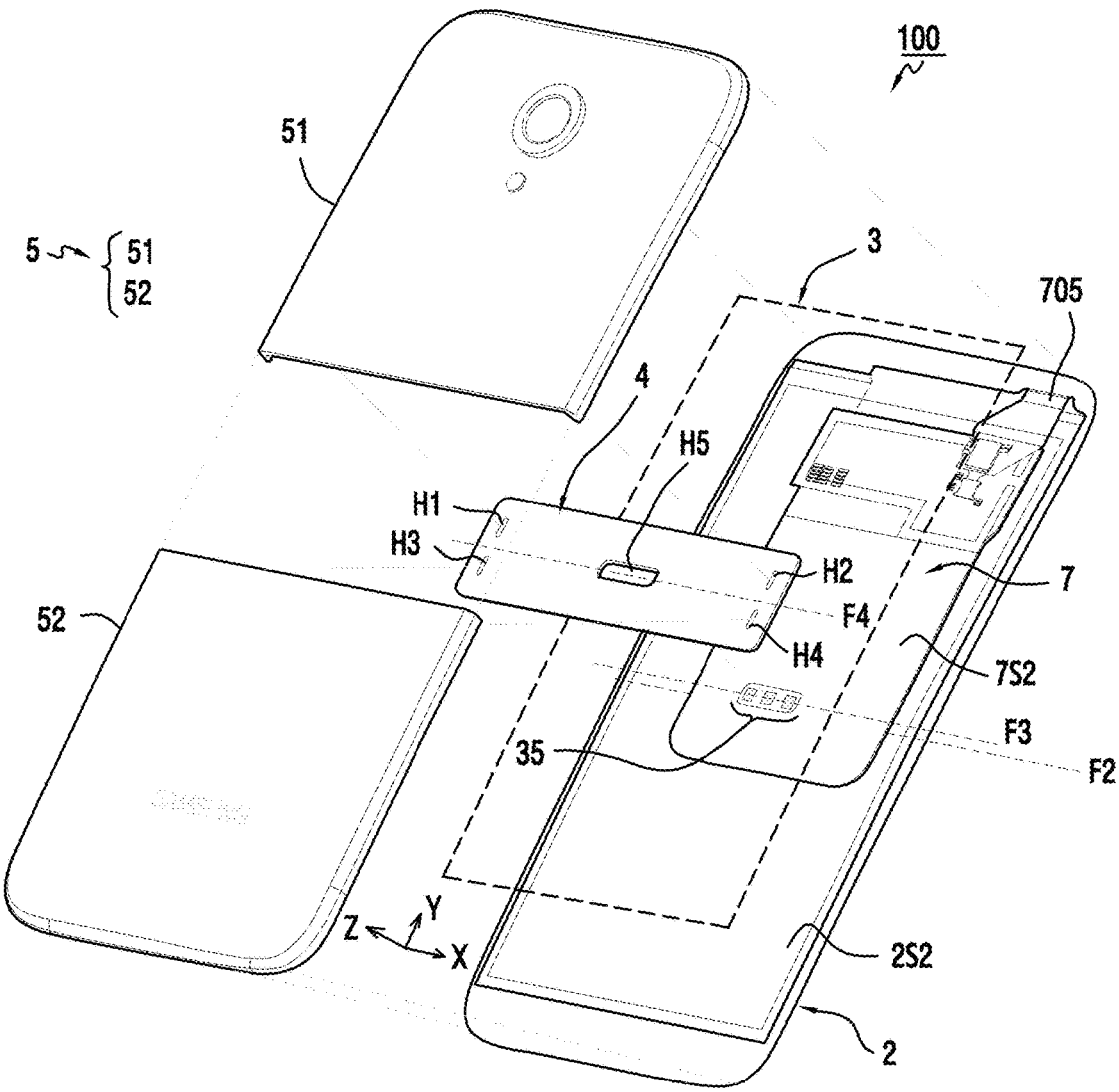

FIG. 12 is an embodiment of an electronic device according to this disclosure.

Referring to FIG. 12, the electronic device 100 may include a display set 2, a circuit board 3, a connection member 4, and a device case 5.

The display set 2 may be of a curved shape. Or, one surface 2S2 of the display set 2 may include a curved surface. The display set 2 may include an electrical connection means (not shown) electrically connecting between the display set 2 and the circuit board 3. The electrical connection means of the display set 2 may be an FPCB having a connector at one end. Or, the electrical connection means of the display set 2 may be a connector mounted on a circuit board 7 for display set. Herein, if the display set 2 are combined or adhered to the circuit board 3, the connector that is surface mounted on the circuit board 7 for display set may be connected with a connector (not shown) being surface mounted on the circuit board 3 (i.e., a board to board connection scheme).

The display set 2 may include the circuit board 7 for display set. The circuit board 7 for display set may be electrically connected to a display panel (e.g., an LCD and an AMOLED) or a touch panel (e.g., a capacitive touch panel or a resistive touch panel) or a digitizer panel (or, a stylus pen recognizing sheet) or a button circuit (e.g., a button 2002-21 related circuit of FIG. 8) or a touch key circuit (e.g., a touch key marker 2002-4 related circuit of FIG. 8) by the medium of an electrical connection means 705 (e.g., an FPCB), and may mount various electronic components (e.g., a Display Driver IC (DDI) and an Analog-to-Digital Converter (ADC)) related to them. As described above, the circuit board 7 for display set may be electrically connected to the circuit board 3, and forward and process a signal under the control of the circuit board 3.

At least one part of the circuit board 7 for display set may be arranged between the circuit board 3 and the one surface 2S2 of the display set 2. The circuit board 7 for display set may have an area capable of covering at least one portion of the one surface 2S2 of the display set 2.

According to an embodiment, the circuit board 7 for display set may be folded using a flexible folding part (F3). For example, the circuit board 7 for display set may form as an FPCB the folding part (F3) and at least one portion extended from the folding part (F3). Herein, the folding part (F3) may be located corresponding to the space (5C of FIG. 8) between the first case body 51 and the second case body 52.

According to an embodiment, the circuit board 7 for a display set may include at least one connection terminal 35 arranged on one surface 7S2 of the circuit board 7 for display set. The at least one connection terminal 35 may be arranged in the folding part (F3) of the circuit board 7 for display set. The at least one connection terminal 35 may be exposed to the external in a folded state of the electronic device 100.

The circuit board 3 may be arranged between the display set 2 and the device case 5. A size and shape of the circuit board 3 are not limited to an area indicated by a dotted line shown in FIG. 12. According to an embodiment, the circuit board 3 may include an omitted part (not shown) that is not overlapped with the at least one connection terminal 35 of the circuit board 7 for display set. That is, if the electronic device 100 is folded, the at least one connection terminal 35 of the circuit board 7 for display set may be exposed through the omitted part (not shown) of the circuit board 3. For example, the circuit board 3 may be arranged in a restricted size within an area corresponding to the first case body 51 or may be arranged in a restricted size within an area corresponding to the second case body 52, in order not to be overlapped with the at least one connection terminal 35.

In another embodiment, the circuit board 3 may also include at least one electronic component, which may be exposed to an area external to the electronic device 100 when the electronic device 100 is in a folded state. The at least one connection terminal 35 may be mounted on the circuit board 3 in place of the circuit board 7 for display set.

The connection member 4 may be arranged between the circuit board 3 and the device case 5, and connect between the first case body 51 and the second case body 52. If the electronic device 100 is folded, the connection member 4 may be folded centering on a folding part (F4). This connection member 4 may be molded of materials having flexibility and elasticity, to facilitate restoration to the original.

According to an embodiment, the connection member 4 may be of a rectangular flat plate shape. The connection member 4 may include a first through-hole (H1), a second through-hole (H2), a third through-hole H3, a fourth through-hole (H4), and a fifth through-hole (H5).

The first through-hole (H1) and the third through-hole (H3) may be arranged at both sides of the folding part (F4), respectively.

The second through-hole (H2) and the fourth through-hole (H4) may be arranged at both sides of the folding part (F4), respectively.

The fifth through-hole (H5) may be arranged between one pair of the through-holes (H1 and H3) and the other pair of the through holes (H2 and H4). The fifth through-hole (H5) may be arranged in a position corresponding to the at least one connection terminal 35 of the circuit board 7 for display set. Or, the fifth through-hole (H5) may be arranged in the folding part (F4).

The device case 5 may cover the one surface 2S2 of the display set 2. The device case 5 may be of a curved shape, and may include the first case body 51 and the second case body 52. The first case body 51 may cover one side of the one surface 2S2 of the display set 2, and the second case body 52 may cover the other side of the one surface 2S2 of the display set 2.

The folding part (F2) of the display set 2, the folding part (F3) of the circuit board 3, and the folding part (F4) of the connection member 4 are overlapped with one another, and may be arranged in the space (5C of FIG. 8) between the first case body 51 and the second case body 52.

Figure 13:
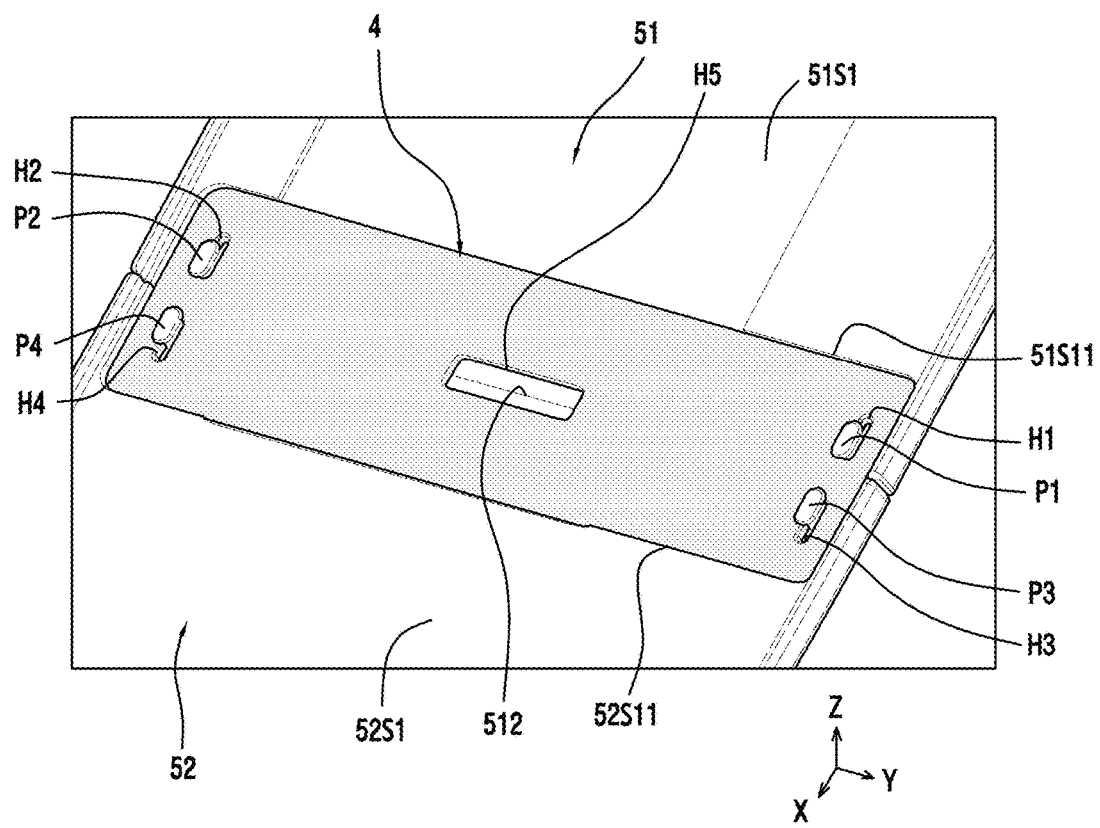
FIG. 13 is a perspective view of a portion of a device case and a connection member according to an embodiment of this disclosure.

FIG. 13 is a perspective view of a portion of a device case and a connection member according to various embodiments of the present disclosure.

Referring to FIG. 13, the connection member 4 may connect between the first case body 51 and the second case body 52.

The first case body 51 may include one surface 51S1 facing a display set (2 of FIG. 12). The one surface 51S1 of the first case body 51 may include a first recess 51S11. Also, the first case body 51 may include a first protrusion (P1) and a second protrusion (P2), which may be arranged in the first recess 51S11. The first protrusion (P1) may be fitted into the first through-hole (H1) of the connection member 4. Also, the second protrusion (P2) may be fitted into the second through-hole (H2) of the connection member 4.

The second case body 52 may include one surface 52S1 facing the display set 2. The one surface 52S1 of the second case body 52 may include a second recess 52S11. Also, the second case body 52 may include a third protrusion (P3) and a fourth protrusion (P4) which are arranged in the second recess 52S11. The third protrusion (P3) may be fitted into the third through-hole (H3) of the connection member 4. Also, the fourth protrusion (P4) may be fitted into the fourth through-hole (H4) of the connection member 4.

The protrusion (P1, P2, P3, or P4) may include a first part (not shown), and a second part (not shown) that are disposed between the first part and the recess (51S11 or 52S11). The second part of the protrusion (P1, P2, P3, or P4) may have a width enabling the protrusion (P1, P2, P3, or P4) to go in and out the through-hole (H1, H2, H3, or H4) of the connection member 4. The second part of the protrusion (P1, P2, P3, or P4) may be arranged in the through-hole (H1, H2, H3, or H4) of the connection member 4. The connection member 4 may be arranged between the one surface 51S1 or 52S1 of the first or second case body 51 or 52 and the first part of the protrusion (P1, P2, P3, or P4). The first part of the protrusion (P1, P2, P3, or P4) may have a relatively larger width than the through-hole (H1, H2, H3, or H4) of the connection member 4. The first part of the protrusion (P1, P2, P3, or P4) may prevent the connection member 4 from escaping from the first case body 51 and the second case body 52.

While the protrusions (P1, P2, P3, and P4) pass through the through-holes (H1, H2, H3, and H4) of the connection member 4, widths of the through-holes (H1, H2, H3, and H4) of the connection member 4 may be extended due to the elasticity of the connection member 4. After the protrusions (P1, P2, P3, and P4) fully pass through the through-holes (H1, H2, H3, and H4) of the connection member 4, the widths of the through-holes (H1, H2, H3, and H4) of the connection member 4 may return to the original shape due to the elasticity of the connection member 4.

Because a space 512 between the first case body 51 and the second case body 52 may be kept away from the folding part (F2 of FIG. 12) of the display set 2, if the electronic device (100 of FIG. 12) is folded, the space 512 between the first case body 51 and the second case body 52 may be separated in a contact state. Since the connection member 4 may be disposed between the first case body 51 and the second case body 52, an extension weight may be additionally applied to the folding part (F4) of the connection member 4. The through-holes (H1, H2, H3, and H4) of the connection member 4 may include passages (not shown) capable of guiding the movement of the second parts of the protrusions (P1, P2, P3, and P4) of the first and second case bodies 51 and 52. If the first case body 51 and the second case body 52 are separated from each other, the protrusions (P1, P2, P3, and P4) of the first and second case bodies 51 and 52 may move within the through-holes (H1, H2, H3, and H4) of the connection member 4. This movement may results in a decrease of the extension weight applicable to the connection member 4. The decrease of the extension weight applicable to the connection member 4 may stop a damage of the connection member 4.

When the electronic device (100 of FIG. 12) is in a non-folded state, the space 512 between the first case body 51 and the second case body 52 may be in a contact state. Also, the space 512 between the first case body 51 and the second case body 52 may be arranged in a position corresponding to the fifth through-hole (H5) of the connection member 4.

Figure 14:
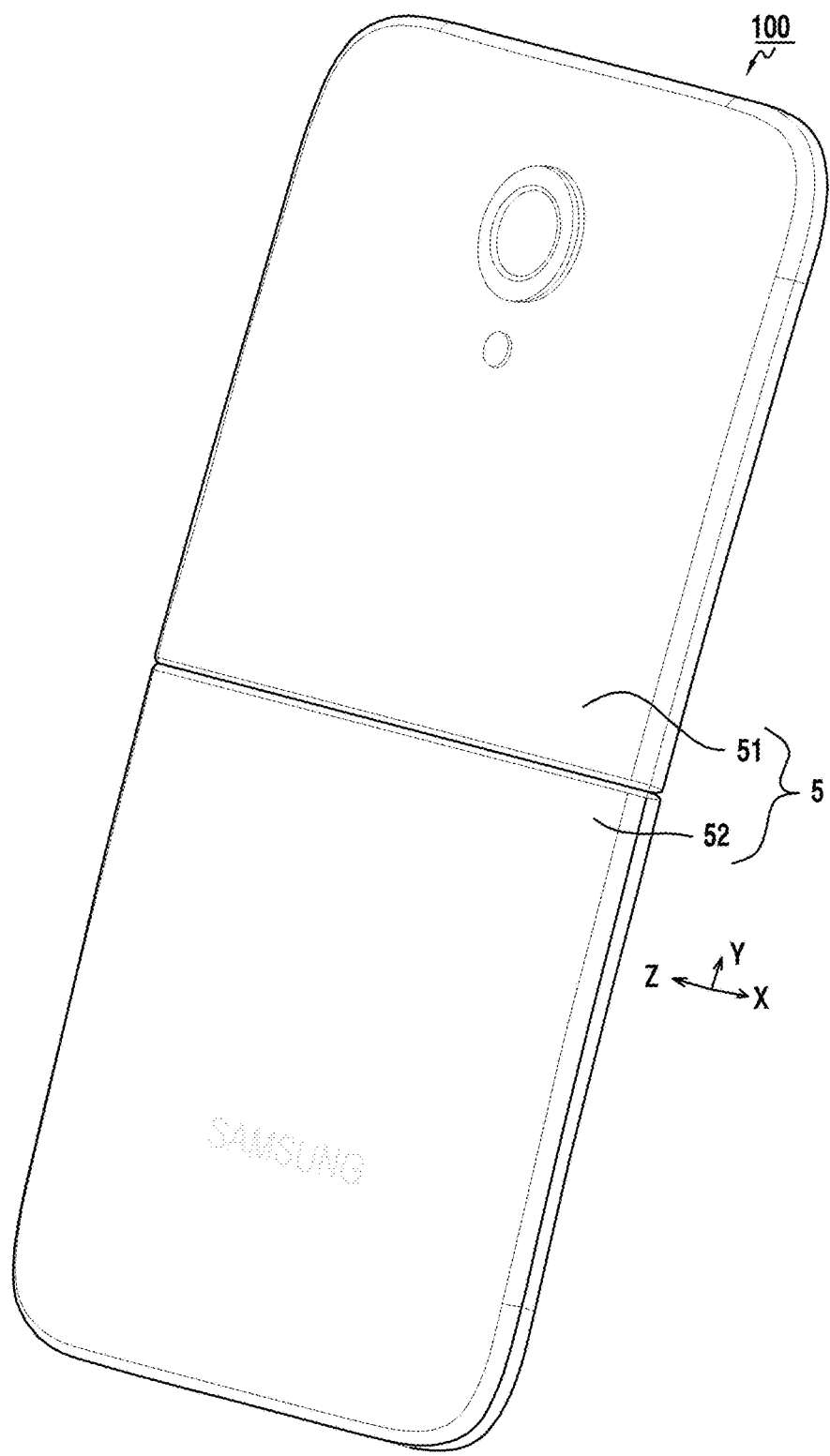
FIG. 14, FIG. 15, FIG. 16 and FIG. 17 are views of an electronic device according to an embodiment of this disclosure.

FIG. 14 is a rear perspective view of an electronic device according to an embodiment of this disclosure.

Referring to FIG. 14, if the electronic device 100 is not folded, a space between the first case body 51 and the second case body 52 may be minute or be in an adhered state. Herein, at least one connection terminal (35 of FIG. 12) may not be exposed to the external.

Figure 15:
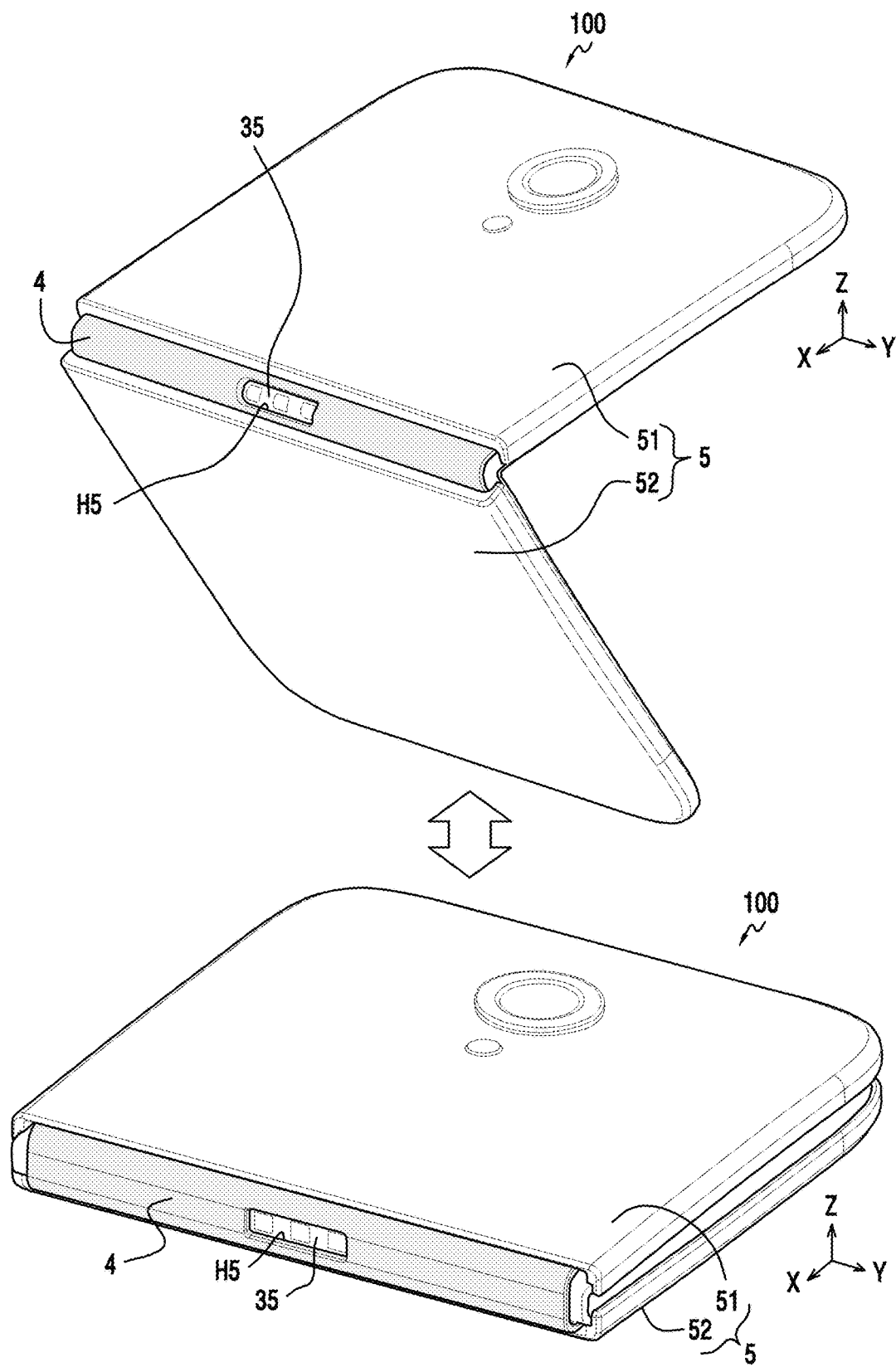

FIG. 15 illustrates transitioning of the electronic device of FIG. 14 between a partially unfolded state and a fully folded state.

Referring to FIG. 15, when the electronic device 100 is folded, the first case body 51 and the second case body 52 may be separated from each other, and the connection member 4 may be exposed through a space between the first case body 51 and the second case body 52. At least one connection terminal 35 may be exposed to the external through the fifth through-hole (H5) of the connection member 4.

Figure 16:
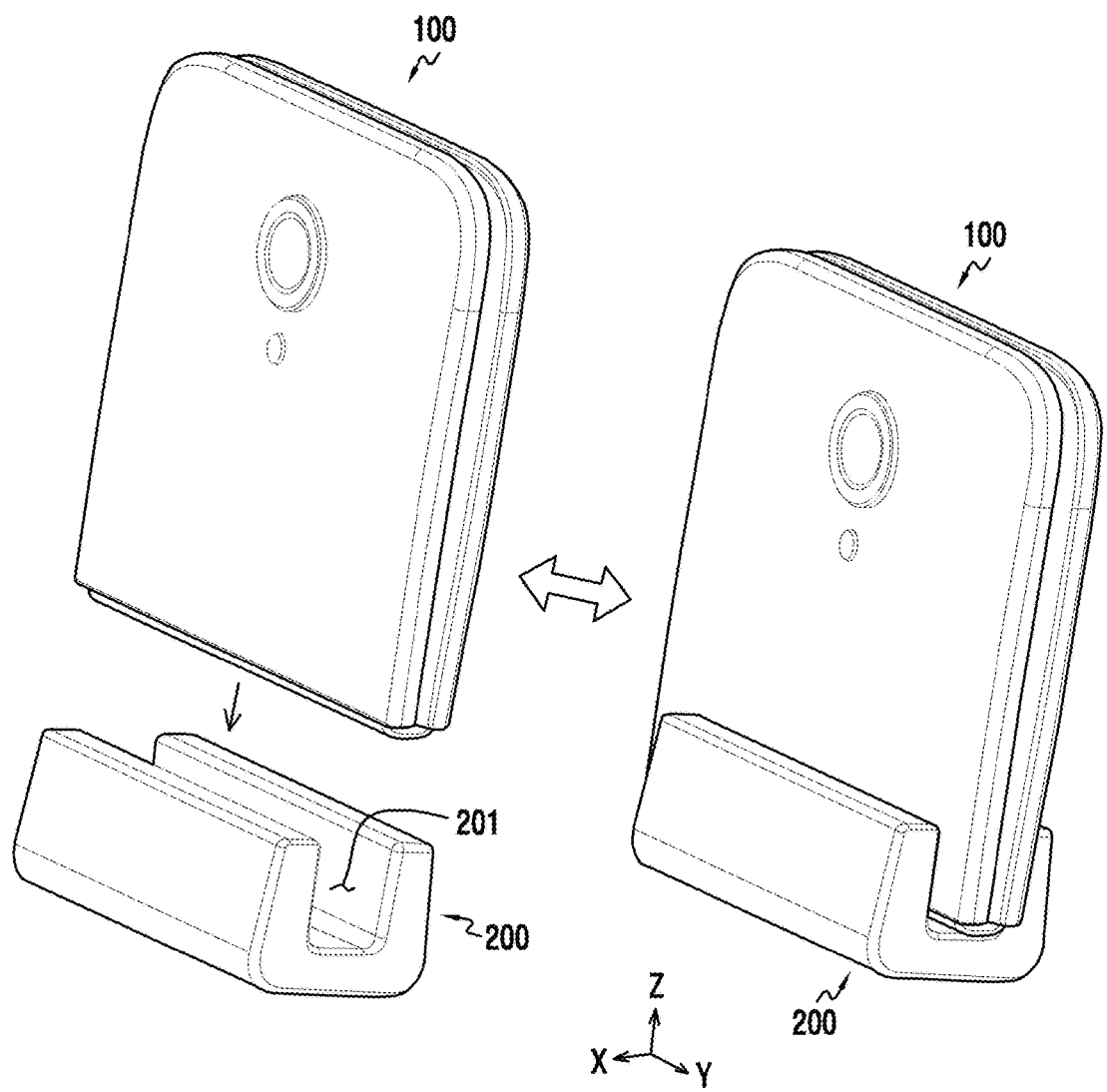
Figure 17:
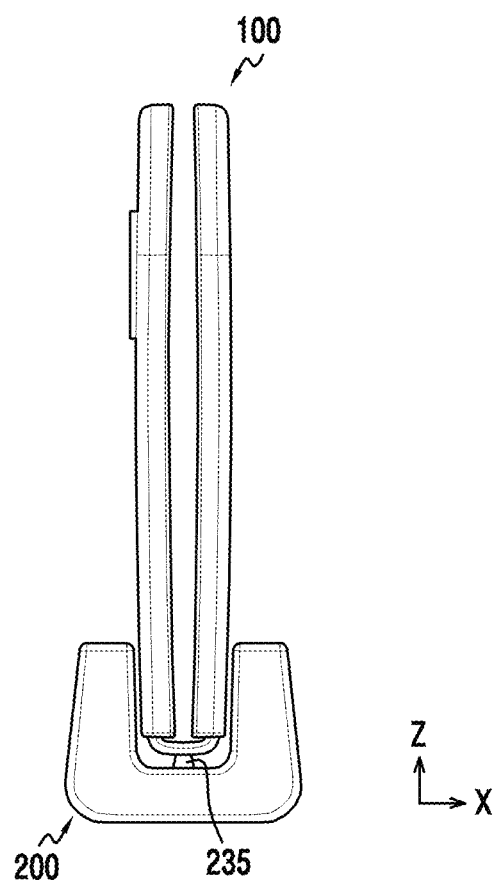

FIG. 16 and FIG. 17 illustrate insertion of the electronic device of FIG. 14 into a rack in accordance with the present disclosure.

Referring to FIG. 16 and FIG. 17, the electronic device 100 may be fitted into an insertion part 201 of a rack 200 (e.g., an electric charger) in its folded state. The rack 200 may include at least one connection terminal 235 arranged in the insertion part 201. At least one connection terminal (not shown) (35 of FIG. 15) of the electronic device 100 and the at least one connection terminal 235 of the rack 200 may come in electric contact with each other.

Figure 18:
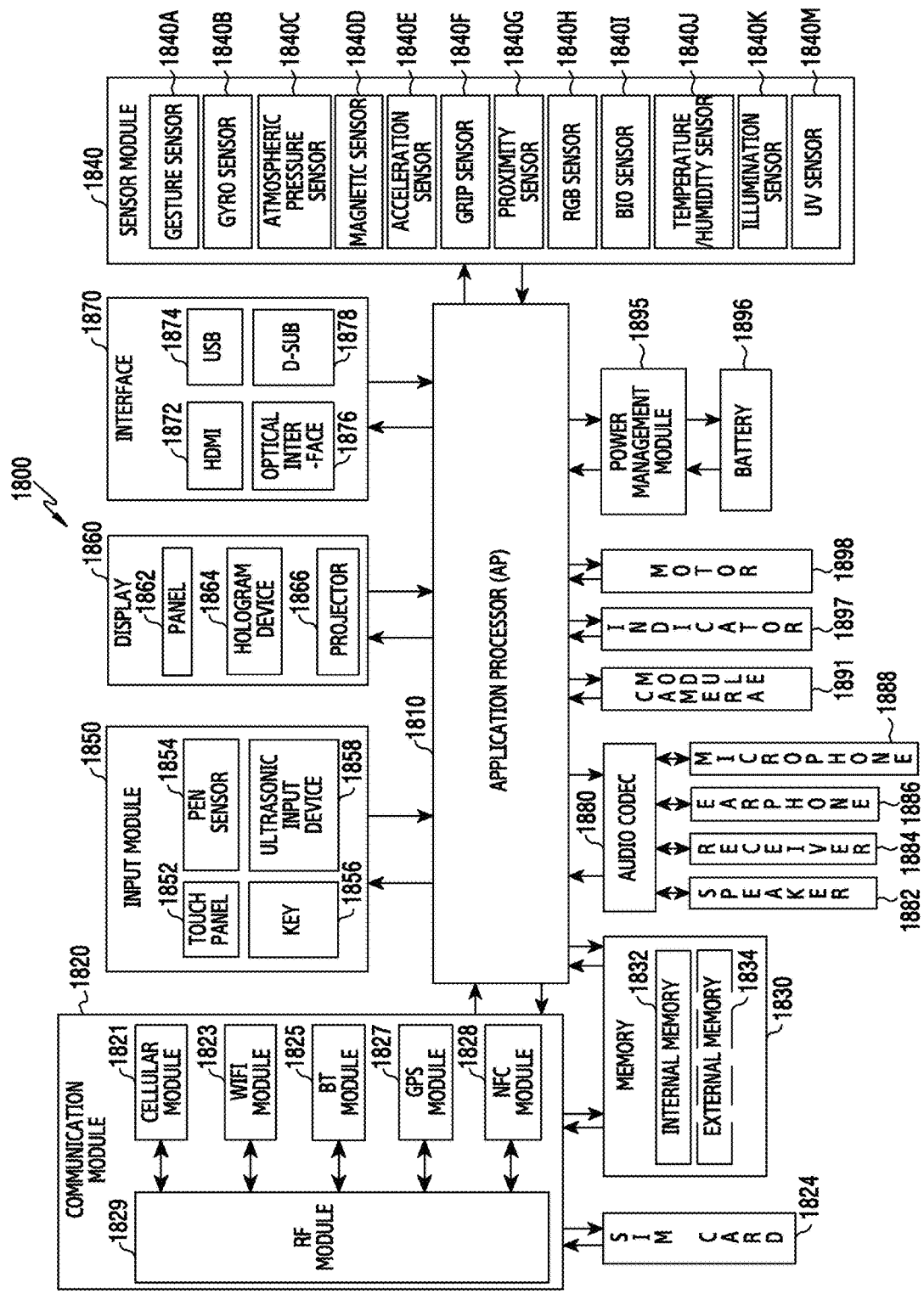
FIG. 18 illustrates a block diagram of an example electronic device according to this disclosure.

FIG. 18 illustrates a block diagram of an example electronic device according to this disclosure. An electronic device 1800 constitutes, for example, the entirety or a part of the electronic device 100 illustrated in FIG. 6. Referring to FIG. 18, the electronic device 1800 may include one or more Application Processors (APs) 1810, a communication module 1820, a Subscriber Identifier Module (SIM) card 1824, a memory 1830, a sensor module 1840, an input device 1850, a display 1860, an interface 1870, an audio module 1880, a camera module 1891, a power management module 1895, a battery 1896, an indicator 1897, and a motor 1898. The AP 1810 may control a plurality of hardware or software elements connected thereto by driving an operating system or an application program and perform data processing and calculations on various types of data including multimedia data. The AP 1810 is implemented as, for example, a System on Chip (SoC). According to an embodiment, the AP 1810 may further include a Graphic Processing Unit (GPU).

The communication module 1820 may perform data transmission/reception in communication between the electronic device 1800 (such as the electronic device 100 of FIG. 6) and other electronic devices connected thereto through a network. According to an embodiment, the communication module 1820 may include a cellular module 1821, a Wi-Fi module 1823, a BT module 1825, a GPS module 1827, an NFC module 1828, and/or a Radio Frequency (RF) module 1829.

The cellular module 1821 provides a voice call, a video call, a text message service, an Internet service or the like through a communication network (such as Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), or the like). Furthermore, the cellular module 1821 may distinguish between and authenticate electronic devices within a communication network, for example, using a subscriber identification module (such as the SIM card 1824). According to an embodiment, the cellular module 1821 performs at least some of the functions that the processor 1810 provides. For example, the cellular module 1821 performs at least some of the multimedia control functions.

According to an embodiment, the cellular module 1821 includes a Communication Processor (CP). In addition, the cellular module 1821 is implemented as, for example, an SoC. In FIG. 18, the elements such as the cellular module 1821 (such as a communication processor), the memory 1830, and the power management module 1895 are illustrated to be separate from the AP 1810. However, according to an embodiment, the AP 1810 may include at least some of the aforementioned elements (such as the cellular module 1821).

According to an embodiment, the AP 1810 or the cellular module 1821 (such as a communication processor) loads instructions or data, received from at least one of a non-volatile memory and the other elements connected thereto, in a volatile memory and process the loaded instructions or data. In addition, the AP 1810 or the cellular module 1821 stores data received from or generated by at least one of the other elements in a non-volatile memory.

The Wi-Fi module 1823, the BT module 1825, the GPS module 1827, or the NFC module 1828 includes a processor for processing data transmitted/received through the corresponding module. In FIG. 18, the cellular module 1821, the Wi-Fi module 1823, the BT module 1825, the GPS module 1827, and the NFC module 1828 are illustrated as separate blocks. However, according to an embodiment, at least some (such as two or more) of the cellular module 1821, the Wi-Fi module 1823, the BT module 1825, the GPS module 1827, and the NFC module 1828 is included in one integrated chip (IC) or IC package. For example, at least some of the processors corresponding to the cellular module 1821, the Wi-Fi module 1823, the BT module 1825, the GPS module 1827, and the NFC module 1828 (such as a communication processor corresponding to the cellular module 1821 and a Wi-Fi processor corresponding to the Wi-Fi module 1823) is implemented as one SoC.

The RF module 1829 may transmit and/or receive data, for example, an RF signal. The RF module 1829 includes, for example, a transceiver, a Power Amp Module (PAM), a frequency filter, a Low Noise Amplifier (LNA), and the like. In addition, the RF module 1829 further includes a component, for example a conductor or conducting wire, for transmitting/receiving electromagnetic waves over free air space in wireless communication. In FIG. 18, the cellular module 1821, the Wi-Fi module 1823, the BT module 1825, the GPS module 1827, and the NFC module 1828 are illustrated to share one RF module 1829. However, according to an embodiment, at least one of the cellular module 1821, the Wi-Fi module 1823, the BT module 1825, the GPS module 1827, and the NFC module 1828 transmit and/or receives an RF signal through a separate RF module.

The SIM card 1824 is a card including a subscriber identification module, and is inserted into a slot formed at a predetermined position of the electronic device. The SIM card 1824 includes unique identification information (such as an integrated circuit card identifier (ICCID)) or subscriber information (such as an international mobile subscriber identity (IMSI)).

The memory 1830 may include an internal memory 1832 and/or an external memory 1834. The internal memory 1832 includes at least one of, for example, a volatile memory (such as a Dynamic Random Access Memory (DRAM), a Static RAM (SRAM), a Synchronous Dynamic RAM (SDRAM), or the like) or a non-volatile memory (such as a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to an embodiment, the internal memory 1832 is a Solid State Drive (SSD). The external memory 1834 further includes a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 1834 is functionally connected to the electronic device 1800 through various interfaces. According to an embodiment, the electronic device 1800 further includes a storage device (or storage medium) such as a hard disc drive.

The sensor module 1840 may measure a physical quantity or sense an operating state of the electronic device 1800, and convert the measured or sensed information into an electric signal. The sensor module 1840 includes at least one of, for example, a gesture sensor 1840A, a gyro sensor 1840B, an atmospheric pressure sensor 1840C, a magnetic sensor 1840D, an acceleration sensor 1840E, a grip sensor 1840F, a proximity sensor 1840G, a color sensor 1840H (such as a Red, Green, and Blue (RGB) sensor), a biometric sensor 1840I, a temperature/humidity sensor 1840J, an illumination sensor 1840K, and an Ultra Violet (UV) sensor 1840M. Additionally or alternatively, the sensor module 1840 includes, for example, an E-nose sensor, an electromyography (EMG) sensor, an electroencephalogram (EEG) sensor, an electrocardiogram (ECG) sensor, an Infrared (IR) sensor, an iris sensor, a fingerprint sensor, or the like. The sensor module 1840 may further include a control circuit for controlling one or more sensors included therein.

The input device 1850 may include a touch panel 1852, a (digital) pen sensor 1854, a key 1856, or an ultrasonic input device 1858. The touch panel 1852 may recognize a touch input based on at least one of, for example, a capacitive type, a resistive type, an infrared type, and an acoustic wave type. In addition, the touch panel 1852 may further include a control circuit. The capacitive type touch panel may recognize physical contact or proximity. The touch panel 1852 further includes a tactile layer. In this case, the touch panel 1852 provides a user with a tactile reaction.

The (digital) pen sensor 1854 is implemented, for example, in the same or a similar method to receiving a user's touch input or using a separate sheet for recognition. The key 1856 includes, for example, a physical button, an optical key, or a keypad. The ultrasonic input unit 1858 identifies data by detecting an acoustic wave with a microphone of the electronic device 1800 through an input unit for generating an ultrasonic signal, and wireless recognition is possible. According to an embodiment, the electronic device 1800 may receive a user input from an external device (such as a computer or server) connected thereto using the communication module 1820.

The display 1860 may include a panel 1862, a hologram device 1864, and/or a projector 1866. The panel 1862 is, for example, a Liquid Crystal Display (LCD), an Active Matrix Organic Light Emitting Diode (AM-OLED), or the like. The panel 1862 is implemented to be, for example, flexible, transparent, or wearable. The panel 1862 is formed as a single module together with the touch panel 1852. The hologram device 1864 shows a stereoscopic image in the air using interference of light. The projector 1866 displays an image by projecting light onto a screen. The screen is disposed in the interior of or on the exterior of the electronic device 1800. According to an embodiment, the display 1860 further includes a control circuit for controlling the panel 1862, the hologram device 1864, or the projector 1866.

The interface 1870 includes, for example, a High-Definition Multimedia Interface (HDMI) 1872, a Universal Serial Bus (USB) 1874, an optical interface 1876, or a D-subminiature (D-sub) 1878. Additionally or alternatively, the interface 1870 includes, for example, a Mobile High-definition Link (MHL) interface, a Secure Digital (SD) card/Multi-Media Card (MMC) interface, or an Infrared Data Association (IrDA) standard interface.

The audio module 1880 may bilaterally convert a sound and an electrical signal. The audio module 1880 processes sound information input or output through, for example, a speaker 1882, a receiver 1884, earphones 1886, the microphone 1888, or the like.

The camera module 1891 is a device for capturing a still image or a video, and according to an embodiment, includes one or more image sensors (such as a front sensor or a rear sensor), a lens, an Image Signal Processor (ISP), or a flash (such as an LED or xenon lamp).

The power management module 1895 manages the power of the electronic device 1800. The power management module 1895 includes, for example, a Power Management Integrated Circuit (PMIC), a charger Integrated Circuit (IC), and/or a battery or fuel gauge.

The PMIC is mounted, for example, in an integrated circuit or an SoC semiconductor. Charging methods is classified into a wired charging method and a wireless charging method. The charger IC charges a battery and prevents the introduction of over-voltage or over-current from a charger. According to an embodiment, the charger IC includes a charger IC for at least one of the wired charging method and the wireless charging method. Examples of the wireless charging method includes, for example, a magnetic resonance method, a magnetic induction method, and an electromagnetic wave method, and an additional circuit for wireless charging, such as a coil loop circuit, a resonance circuit, or a rectifier circuit, is added.

The battery gauge measures, for example, a residual quantity of the battery 1896, and a voltage, a current, or a temperature while charging. The battery 1896 stores or generates electricity and supplies power to the electronic device 1800 using the stored or generated electricity. The battery 1896 includes, for example, a rechargeable battery or a solar battery.

The indicator 1897 indicates a particular state of the electronic device 1800 or a part thereof (such as the AP 1810), such as a boot-up state, a message state, a charging state, or the like. The motor 1899 converts an electric signal into mechanical vibration. The electronic device 1800 includes a processing unit (such as a GPU) for supporting mobile TV. The processing device for supporting mobile TV processes, for example, media data associated with the standard of Digital Multimedia Broadcasting (DMB), Digital Video Broadcasting (DVB), a media flow, or the like.

Figure 19:
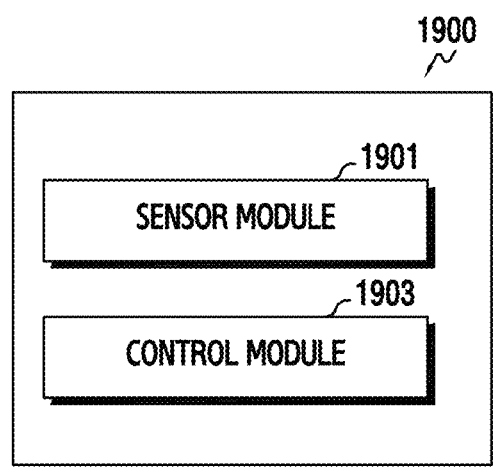
FIG. 19 illustrates a block diagram of an example electronic device according to this disclosure.

FIG. 19 illustrates a block diagram of an example electronic device according to this disclosure.

Referring to FIG. 19, the electronic device 1900 may include a sensor module 1901 and a control module 1903.

The sensor module 1901 (e.g., the sensor module 1840 of FIG. 18) may sense folding of the electronic device 1900.

In response to the folding of the electronic device 1900 from the sensor module 1901, the control module 1903 (e.g., the processor 1810) may control at least one operation or function.

Figure 20:
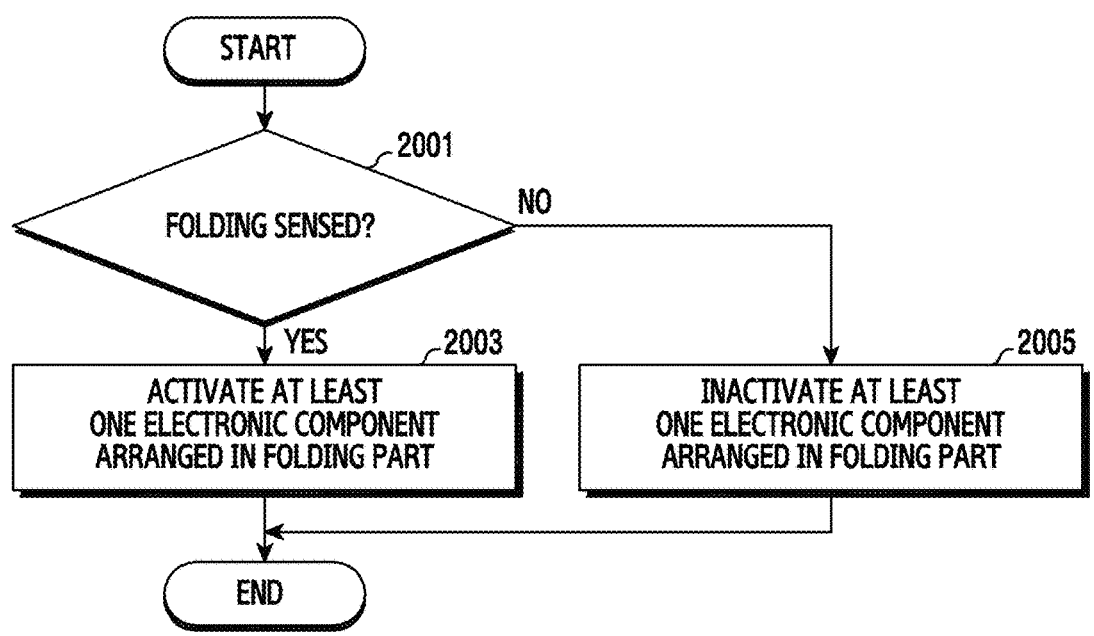
FIG. 20 illustrates a flowchart of an operation of an example electronic device according to this disclosure.

FIG. 20 illustrates a flowchart of an operation of an example electronic device according to this disclosure.

Referring to FIG. 20, in operation 2001, the control module 1903 may determine if the electronic device (e.g., 100 of FIG. 8) is folded.

In operation 2003, in response to the folding of the electronic device 100, the control module 1903 may activate at least one electronic component (e.g., 15 of FIG. 1) arranged in a folding part of the electronic device 100.

In operation 2005, when the electronic device 100 is not folded or is unfolded, the control module 1903 may inactivate the at least one electronic component 15 arranged in the folding part of the electronic device 100. Alternatively, the at least one electronic component 15 may be activated when the electronic device 100 is folded or vice versa.

Figure 21:
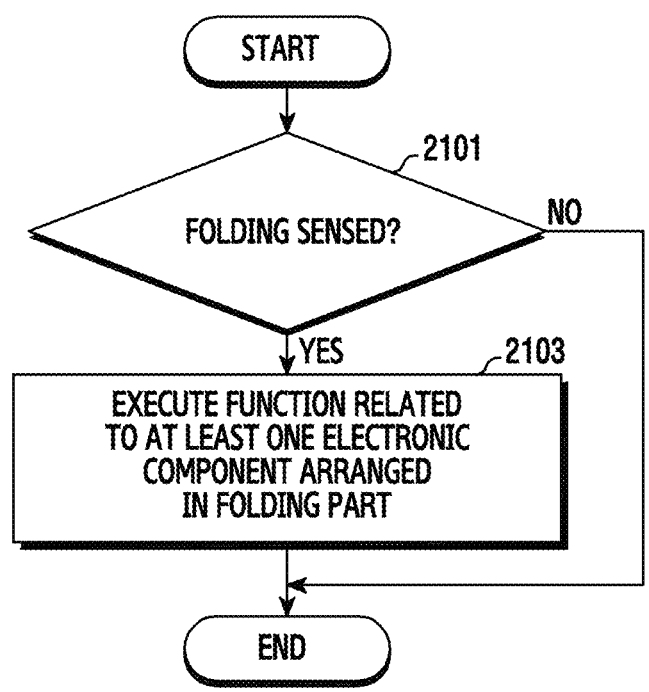
FIG. 21 illustrates a flowchart of an operation of an example electronic device according to this disclosure.

FIG. 21 illustrates a flowchart of an operation of an example electronic device according to this disclosure.

Referring to FIG. 21, in operation 2101, the control module 1903 may determine if the electronic device (e.g., 100 of FIG. 8) is folded.

In operation 2103, in response to the folding of the electronic device 100, the control module 1903 may execute a function related to at least one electronic component 15 arranged in a folding part of the electronic device 100. For example, the control module 1903 may execute an application using the at least one electronic component 15 and provide the application execution result as an image or voice.

According to an embodiment of the present disclosure, an electronic device 100 may include a foldable housing (e.g., a device case 5), and at least one electronic component 15 arranged within the housing 5. Herein, the at least one electronic component 15 may be exposed to the external through a folding part of the housing 5 in a folded state of the housing 5.

According to an embodiment of the present disclosure, the electronic device 100 may further include a flexible circuit board 3 arranged within the housing 5. Herein, the flexible circuit board 3 is foldable together with the housing 5.

According to an embodiment of the present disclosure, the at least one electronic component 15 may include at least one connector.

According to an embodiment of the present disclosure, the at least one connector may include a copper film pad (e.g., a connection terminal 35 of FIG. 15) that is surface mounted on one surface of a circuit board.

According to an embodiment of the present disclosure, the at least one electronic component 15 may include at least one of a camera module (e.g., 1891 of FIG. 18) and a sensor module (e.g., 1840 of FIG. 18).

According to an embodiment of the present disclosure, the at least one electronic component 15 may be arranged or disposed within the housing 5.

According to an embodiment of the present disclosure, the electronic device 100 may further include a flexible screen (e.g., a display area 2001 of FIG. 7) arranged on one surface of the housing 5. The flexible screen 2001 may be foldable together with the housing 5.

According to an embodiment of the present disclosure, the flexible screen 2001 may receive a touch input.

According to an embodiment of the present disclosure, the housing (e.g., the device case 5) is of a curved shape.

According to an embodiment of the present disclosure, the housing 5 may include a first housing (e.g., a first case body 51) and a second housing (e.g., a second case body 52) that are separated from each other. The folding part of the housing 5 may be arranged between the first housing 51 and the second housing 52.

According to an embodiment of the present disclosure, the electronic device 100 may further include a flexible member (e.g., a connection member 4) connecting the first housing 51 and the second housing 52.

According to another embodiment of the present disclosure, an operation method of a foldable electronic device 100 may include sensing folding of the electronic device 100 (operation 2001), and activating at least one electronic component 15 arranged in a folding part of the electronic device 100 (operation 2003).

According to another embodiment of the present disclosure, the operation method of the foldable electronic device 100 may include sensing unfolding of the electronic device 100 (operation 2001), and inactivating the at least one electronic component 15 arranged in the folding part of the electronic device 100 (operation 2005).

According to another embodiment of the present disclosure, the operation method of the foldable electronic device 100 may further include providing an image or voice related to the at least one electronic component 15 arranged in the folding part of the electronic device 100 (operation 2103).

According to a further embodiment of the present disclosure, an electronic device may include a foldable housing (e.g., a device case 5), at least one electronic component arranged within the housing 5, and exposed to the external through a folding part of the housing 5 in a folded state of the housing 5, a sensor module 1901 for sensing folding of the housing 5, and a control module 1903 for activating the at least one electronic component arranged or disposed in the folding part of the housing 5, in response to the folding of the housing 5.

According to a further embodiment of the present disclosure, the control module 1903 may inactivate the at least one electronic component arranged in the folding part of the housing 5, in response to unfolding of the housing 5.

According to a further embodiment of the present disclosure, the control module 1903 may provide through an output module (e.g., a screen and a speaker) an image or voice related to the at least one electronic component arranged in the folding part of the housing 5, in response to the folding of the housing 5.

According to various embodiments of the present disclosure, in a state in which an electronic device is unfolded, a specific electronic component (e.g., a connector) of the electronic device is not exposed to the external. So, an appearance of the electronic device may get beautiful. Also, a scheme of exposing the electronic component (e.g., the connector) to the external in a state in which the electronic device is folded may provide a user with a fresh use method of the electronic device.

Each of the aforementioned constituent elements of the electronic device according to an embodiment of the present disclosure may consist of one or more components, and a name of the corresponding constituent element may be different according to the kind of electronic device. The electronic device according to an embodiment of the present disclosure may include at least one of the aforementioned constituent elements, and may omit some constituent elements or further include additional other constituent elements. Also, some of the constituent elements of the electronic device according to an embodiment of the present disclosure are combined to form one entity, thereby identically performing the functions of the corresponding constituent elements before combination.

The above described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. An electronic device comprising:
    a foldable housing including a folding part, the foldable housing capable of changing between a folded state and an unfolded state; and
    at least one electronic component arranged within the foldable housing,
    wherein the at least one electronic component is exposed to an exterior of the foldable housing through the folding part of the foldable housing in the folded state, and is not exposed to the exterior of the foldable housing in the unfolded state.
2. The electronic device of claim 1, further comprising a flexible circuit board arranged within the foldable housing, wherein the flexible circuit board is foldable together with the foldable housing.
3. The electronic device of claim 1, wherein the at least one electronic component comprises at least one connector.
4. The electronic device of claim 3, further comprising a circuit board arranged within the foldable housing, wherein the at least one connector comprises a copper film pad that is mounted on a surface of the circuit board.
5. The electronic device of claim 1, wherein the at least one electronic component comprises at least one of a camera module and a sensor module.
6. The electronic device of claim 1, wherein the at least one electronic component is fixed on the foldable housing.
7. The electronic device of claim 1, further comprising a flexible screen dividing into a first screen and a second screen based on the folding part and arranged on a surface of the foldable housing,
    wherein, in the folded state, the flexible screen is foldable with the foldable housing, such that the first screen face the second screen.
8. The electronic device of claim 7, wherein the flexible screen is configured to receive a touch input.
9. The electronic device of claim 1, wherein the foldable housing has a curved shape.
10. The electronic device of claim 1, wherein the foldable housing comprises:
    a first housing and a second housing that are separated from each other; and
    a connection part arranged in the folding part of the foldable housing between the first housing and the second housing.
11. The electronic device of claim 10, wherein the connection part comprises a flexible member, and
    wherein the connection part is configured to connect the first housing and the second housing.
12. The electronic device of claim 1, further comprising:
    at least one sensor;
    a memory;
    at least one processor; and
    at least one program, wherein the at least one program is stored in the memory and configured to be executed by the at least one processor, the at least one program comprising instructions for:
    in response to a detection of the folding of the electronic device, activating at least one electronic component.
13. The electronic device of claim 12, wherein the at least one program further comprises instructions for:
    in response to the detection of the unfolding of the electronic device, inactivating the at least one electronic component.
14. The electronic device of claim 2, wherein the at least one program further comprises instructions for:
    in response to the detection of the folding of the electronic device, outputting information regarding the folding state by using at least one of a speaker and an indicator.
15. An electronic device for providing a folded state and an unfolded state, comprising:
    a first housing comprising a first surface and a second surface opposing to the first surface;
    a second housing comprising a third surface and a fourth surface opposing to the third surface, the second housing is pivotally coupled to the first housing;
    a flexible display disposed on the first surface of the first housing and the third surface of the second housing; and
    an electronic component disposed at a coupling portion between the first housing and the second housing,
    wherein the electronic component is not exposed to an exterior of the electronic device in the unfolded state when the first housing and the second housing are substantially planar such that the second surface of the first housing and the fourth surface of the second housing are substantially planar, and wherein the electronic component is exposed to an exterior of the electronic device in the folded state when the first surface of the first housing face the third surface of the second housing such that the second surface of the first housing and the fourth surface of the second housing are separated and the coupling portion is exposed.

16. The electronic device of claim 15, further comprising a connection part coupling the first housing and the second housing, wherein, in the folded state, the connection part is folded relatively to the first housing and the second housing such that the connection part is exposed to the exterior of the electronic device.

17. The electronic device of claim 16, wherein the connection part comprises a hall, and the electronic component is exposed through the hall of the connection part when the electronic device is in the folded state.

\* \* \* \* \*